US012634851B2

(12) United States Patent
Yang et al.

(10) Patent No.: US 12,634,851 B2
(45) Date of Patent:     May 19, 2026

(54) SIDELINK COMMUNICATION

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Jinyup Hwang, Seoul (KR); Jongkeun Park, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 514 days.

(21) Appl. No.: 18/026,073

(22) PCT Filed: Sep. 13, 2021

(86) PCT No.: PCT/KR2021/012416
§ 371 (c)(1),
(2) Date: Mar. 13, 2023

(87) PCT Pub. No.: WO2022/060032
PCT Pub. Date: Mar. 24, 2022

(65) Prior Publication Data
US 2023/0362851 A1     Nov. 9, 2023

(30) Foreign Application Priority Data

Sep. 18, 2020   (KR) ........................ 10-2020-0120161
Sep. 18, 2020   (KR) ........................ 10-2020-0120199

(51) Int. Cl.
*H04W 56/00*          (2009.01)

(52) U.S. Cl.
CPC ...  *H04W 56/0015* (2013.01); *H04W 56/0065* (2013.01)

(58) Field of Classification Search
None
See application file for complete search history.

(56) References Cited

U.S. PATENT DOCUMENTS

| | | | | |
|---|---|---|---|---|
| 2017/0289940 A1* | 10/2017 | Yang | ..................... | H04W 76/27 |
| 2018/0287840 A1* | 10/2018 | Akkarakaran | ........ | H04L 27/262 |
| 2019/0045469 A1* | 2/2019 | Zhang | ..................... | H04W 4/40 |
| 2019/0174411 A1* | 6/2019 | Xu | ......................... | H04W 52/02 |
| 2020/0146095 A1* | 5/2020 | Hsieh | .................... | H04W 76/28 |
| 2020/0245275 A1* | 7/2020 | Thangarasa | ........ | H04W 56/001 |

(Continued)

FOREIGN PATENT DOCUMENTS

| | | | |
|---|---|---|---|
| WO | 2017/123047 A1 | 7/2017 | |
| WO | WO-2021254590 A1 * | 12/2021 | ............ H04W 24/08 |

OTHER PUBLICATIONS

Huawei, Sidelink Synchronization Mechanisms for NR V2X, Apr. 2019, 3GPP TSG RAN WG1 Meeting #96bis, R1-1903946, pp. 1-9. (Year: 2019).*

(Continued)

*Primary Examiner* — Nicholas Sloms
(74) *Attorney, Agent, or Firm* — BRYAN CAVE LEIGHTON PAISNER LLP

(57)          ABSTRACT
One disclosure of the present specification provides a method by which a UE performs sidelink communication. The method may comprise the steps of: determining whether to transmit SLSS; and transmitting the SLSS or not transmitting the SLSS on the basis of the determination.

4 Claims, 16 Drawing Sheets

(56) References Cited

U.S. PATENT DOCUMENTS

| | | | |
|---|---|---|---|
| 2020/0267690 A1* | 8/2020 | Hsieh | H04W 76/28 |
| 2020/0280957 A1* | 9/2020 | Gao | H04W 72/0446 |
| 2021/0051614 A1* | 2/2021 | Gulati | H04W 56/0015 |
| 2021/0051617 A1* | 2/2021 | Gulati | H04W 56/0015 |
| 2021/0234663 A1* | 7/2021 | Kim | H04L 5/0048 |
| 2021/0274465 A1* | 9/2021 | Huang | H04W 68/005 |
| 2022/0070781 A1* | 3/2022 | Karakkad Kesavan Namboodiri | H04L 5/0048 |
| 2022/0070965 A1* | 3/2022 | Li | H04W 76/28 |
| 2022/0117029 A1* | 4/2022 | Takada | H04W 76/28 |
| 2022/0279581 A1* | 9/2022 | Baek | H04W 64/00 |
| 2023/0124916 A1* | 4/2023 | Lindholm | H04W 56/002 370/329 |

OTHER PUBLICATIONS

ITRI, Discussion on Sidelink Synchronization Issues and Mechanisms for NR V2X Communication, Aug. 2019, 3GPP TSG RAN WG1 #98, R1-1908889, pp. 1-10. (Year: 2019).*

Huawei, Sidelink Synchronization Mechanisms for NR V2X, Aug. 2019, 3GPP TSG RAN WG1 Meeting #98, R1-1908043, pp. 1-18. (Year: 2019).*

3GPP TS 38.133 V16.3.0 (Mar. 2020), Release 16, pp. 31-244.

3GPP TS 38.133 V16.4.0 (Jun. 2020), "3rd Generation Partnership Project; Technical Specification Group Radio Access Network; NR; Requirements for support of radio resource management (Release 16)", pp. 1-321.

3GPP TS 38.331 V16.1.0 (Jul. 2020), "3rd Generation Partnership Project; Technical Specification Group Radio Access Network; NR; Radio Resource Control (RRC) protocol specification (Release 16)", 1-906.

3GPP TS 38.533 V16.4.0 (Jun. 2020), "3rd Generation Partnership Project; Technical Specification Group Radio Access Network; NR; User Equipment (UE) conformance specification; Radio Resource Management (RRM) (Release 16)", pp. 1-556.

Apple, 3GPP TSG-RAN4 Meeting #95e Online, May 25, 2020-Jun. 5, 2020, R4-2008662, revision of R4-2006217, 26 pages.

* cited by examiner

Figure 3:
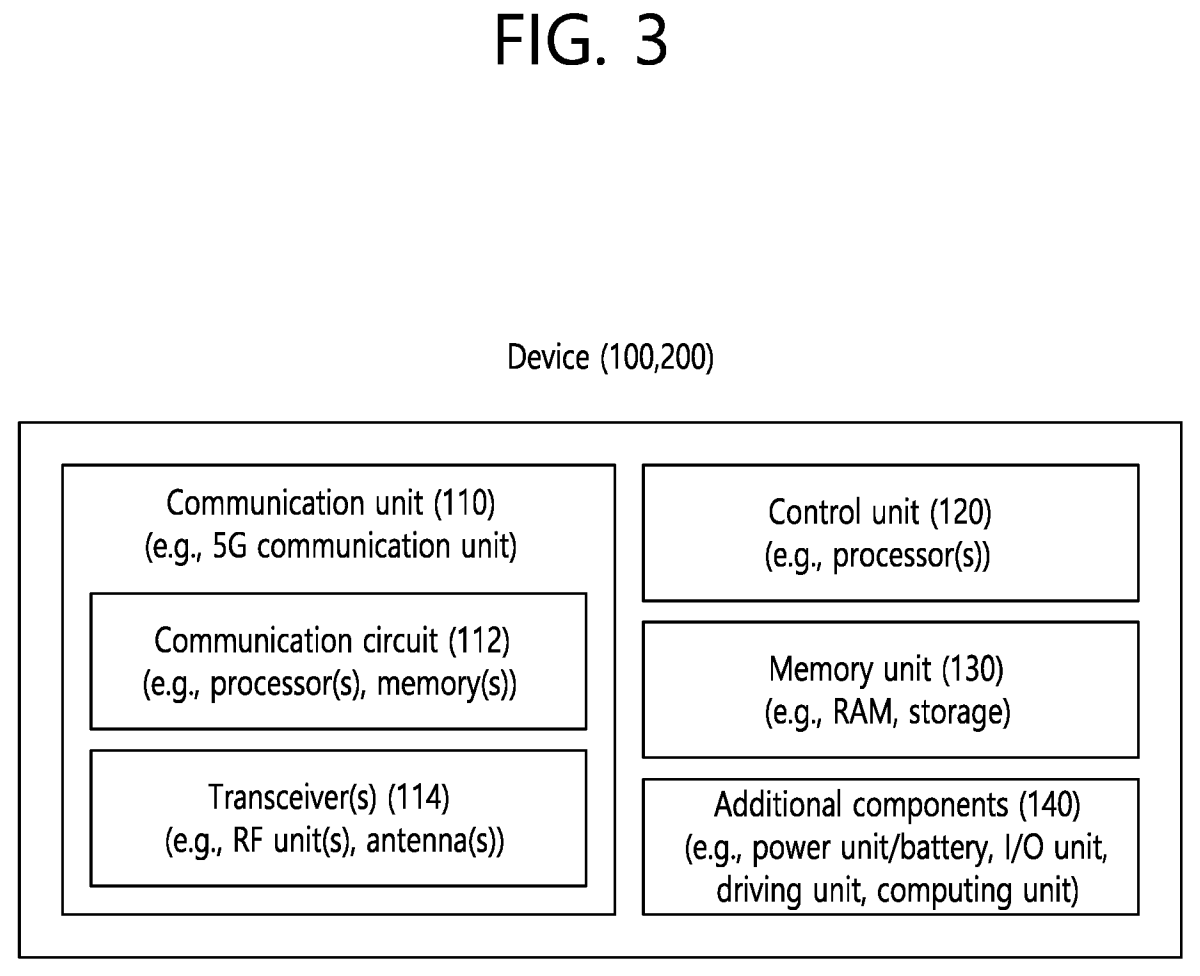

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

PC5-C

BS(e.g. eNB or gNB)

Figure 10:
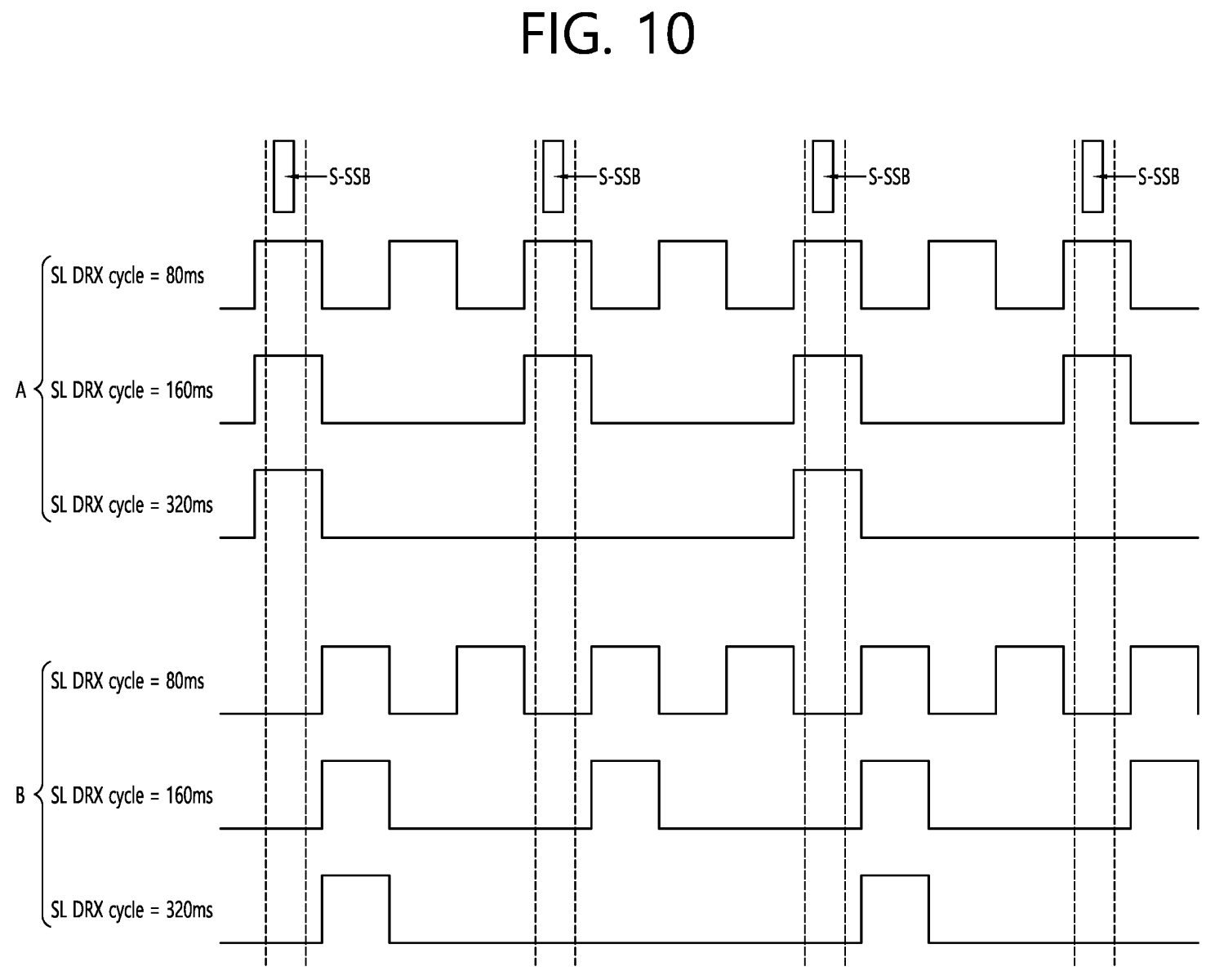

S-SSB

S-SSB

S-SSB

S-SSB

SL DRX cycle = 80ms
SL DRX cycle = 160ms
SL DRX cycle = 320ms

A

SL DRX cycle = 80ms
SL DRX cycle = 160ms
SL DRX cycle = 320ms

B

SIDELINK COMMUNICATION

CROSS-REFERENCE TO RELATED APPLICATIONS

This application is the National Stage filing under 35 U.S.C. 371 of International Application No. PCT/KR2021/012416, filed on Sep. 13, 2021, which claims the benefit of Korean Patent Application No. 10-2020-0120199 filed on Sep. 18, 2020 and Korean Patent Application No. 10-2020-0120161 filed on Sep. 18, 2020, the contents of which are all hereby incorporated by reference herein in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Sidelink (SL) communication is a communication scheme in which a direct link is established between User Equipments (UEs), and the UEs exchange voice and data directly with each other without intervention of a base station (BS). SL communication is under consideration as a solution to the overhead of a BS caused by rapidly increasing data traffic.

A terminal performing SL communication may transmit an SL synchronization signal (SLSS) to neighboring terminals. The terminal may start SLSS transmission to synchronize time with neighboring terminals. However, conventionally, an operation for the NR UE to start transmission of SLSS and an operation to stop transmission of SLSS have not been specifically defined. For example, conventionally, an operation for the NR UE to start transmission of SLSS and an operation to stop transmission of SLSS since were simply defined considering only the RSRP of the serving cell or the RSRP of the neighboring terminal, and without considering the cell size and UE speed, there is a problem of inefficiency when the cell size is small and/or the terminal speed is high.

SUMMARY

Accordingly, a disclosure of the present specification has been made in an effort to solve the aforementioned problem.

In order to solve the above problems, one disclosure of the present specification provides a method for a UE to perform sidelink communication. The method includes determining whether to transmit SLSS; and based on the determination, transmitting the SLSS or not transmitting the SLS S.

In order to solve the above problems, one disclosure of the present specification provides a UE performing sidelink communication. The UE includes at least one transceiver; at least one processor; and at least one memory that stores instructions and is operatively electrically connectable with the at least one processor. The operations performed based on the instructions being executed by the at least one processor include: determining whether to transmit SLSS; and based on the determination, transmitting the SLSS or not transmitting the SLSS.

In order to solve the above problems, one disclosure of the present specification provides a apparatus in mobile communication. The apparatus includes at least one processor; and at least one memory that stores instructions and is operably electrically connectable with the at least one processor, wherein the operations performed based on the instructions being executed by the at least one processor include: determining whether to transmit SLSS; and based on the determination, transmitting the SLSS or not transmitting the SLSS.

In order to solve the above problems, one disclosure of the present specification provides a non-volatile (non-volatile) computer readable storage medium recording instructions. The instructions, when executed by one or more processors, cause the one or more processors to perform operations comprising: determining whether to transmit SLSS; and based on the determination, transmitting the SLSS or not transmitting the SLSS.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 1 shows an example of a communication system to which implementations of the present disclosure are applied.

FIG. 2 shows an example of wireless devices to which implementations of the present disclosure are applied.

FIG. 3 shows an example of a wireless device to which implementations of the present disclosure are applied.

FIG. 10 shows an example of SL DRX On duration and S-SSB according to an embodiment of the second disclosure of the present specification.

DETAILED DESCRIPTION

Figure 4:
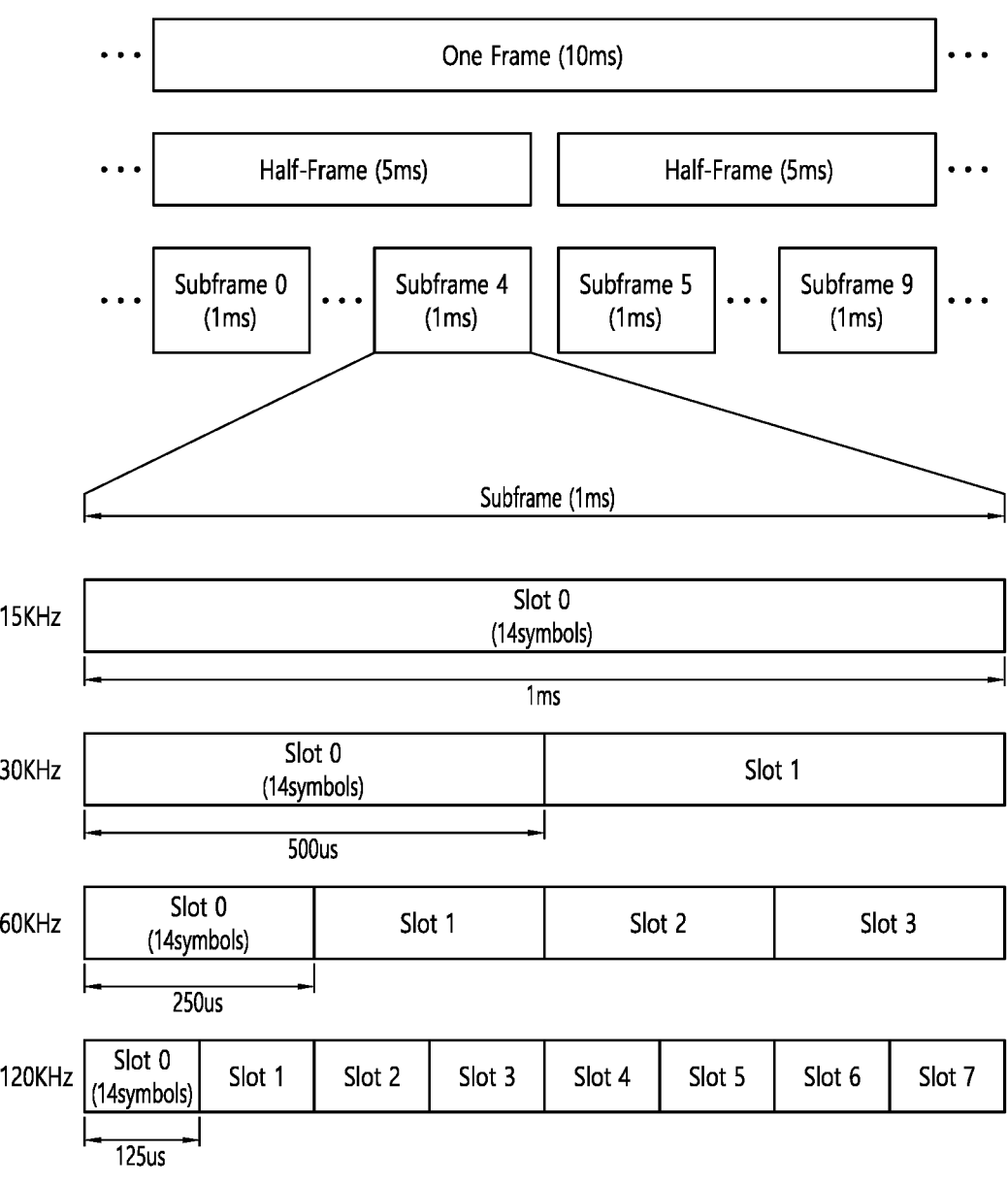
FIG. 4 illustrates an example of a structure of an NR system to which the implementation of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the accompanying drawings, a User Equipment (UE) is shown in an exemplary manner, however, the shown UE may also be referred to as a term such as a Terminal, a Mobile Equipment (ME), and the like. Furthermore, the UE may be not only a portable device such as a notebook, a mobile phone, a PDA, a smart phone, a multimedia device, and the like, but also a non-portable device such as a PC and a vehicle mounted device.

Hereinafter, a UE is used as an example of a wireless communication device (or wireless apparatus or a wireless device) for which wireless communication is available. The operation performed by a UE may be performed by a wireless communication device. The wireless communication device may also be referred to as a wireless apparatus or a wireless device. Hereinafter, an AMF may mean an AMF node, an SMF may mean an SMF node, and a UPF may mean a UPF node.

The term, "base station" used below may be referred to as a fixed station that communicates with a wireless device, generally, and may also be called a different term such as an evolved-NodeB (eNodeB), an evolved-NodeB (eNB), a Base Transceiver System (BTS), an Access Point, a Next generation NodeB (gNB), and the like.

I. Technique and Procedure Applicable to the Disclosure of the Present Specification.

Figure 1:
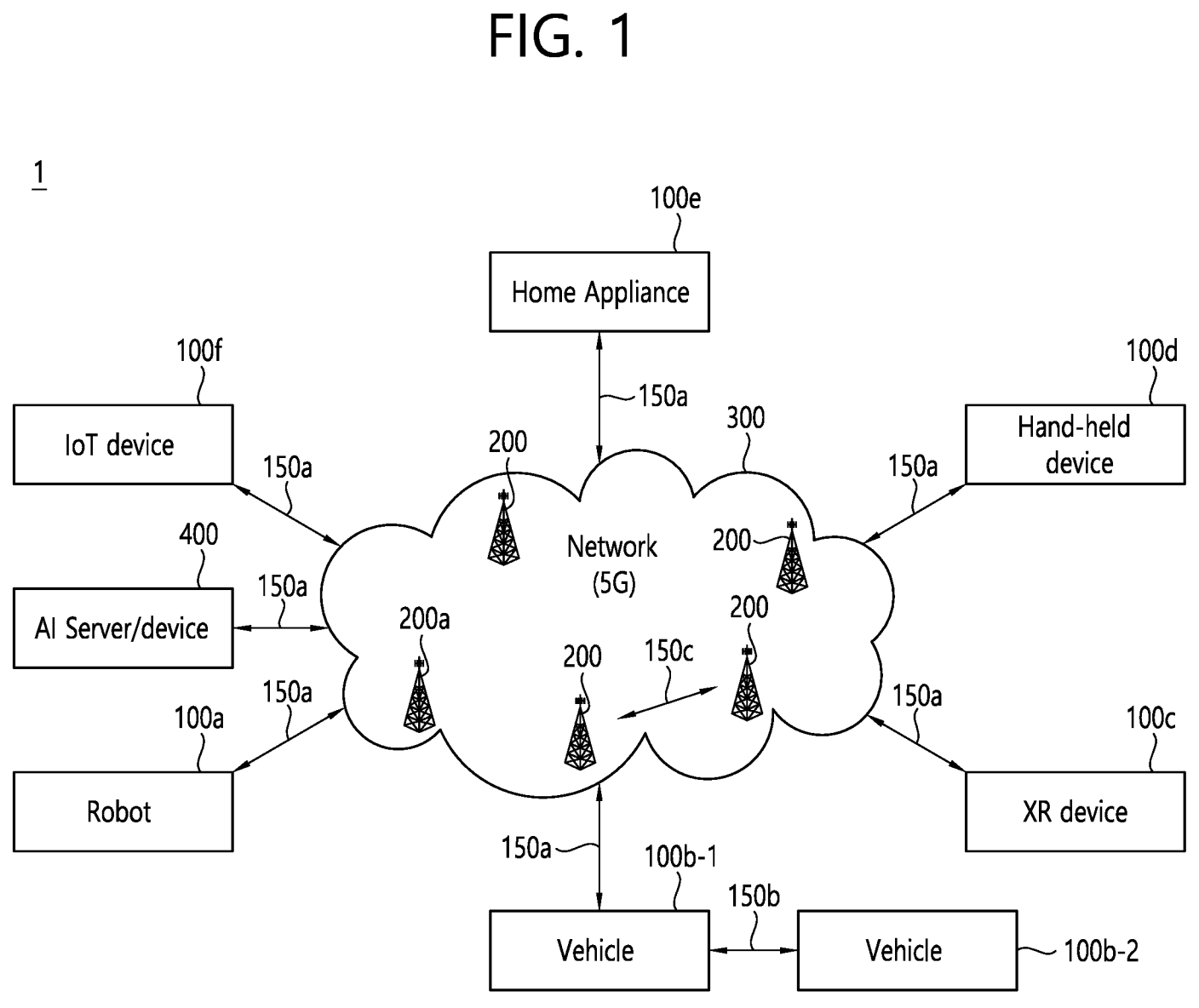

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHZ | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHZ | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
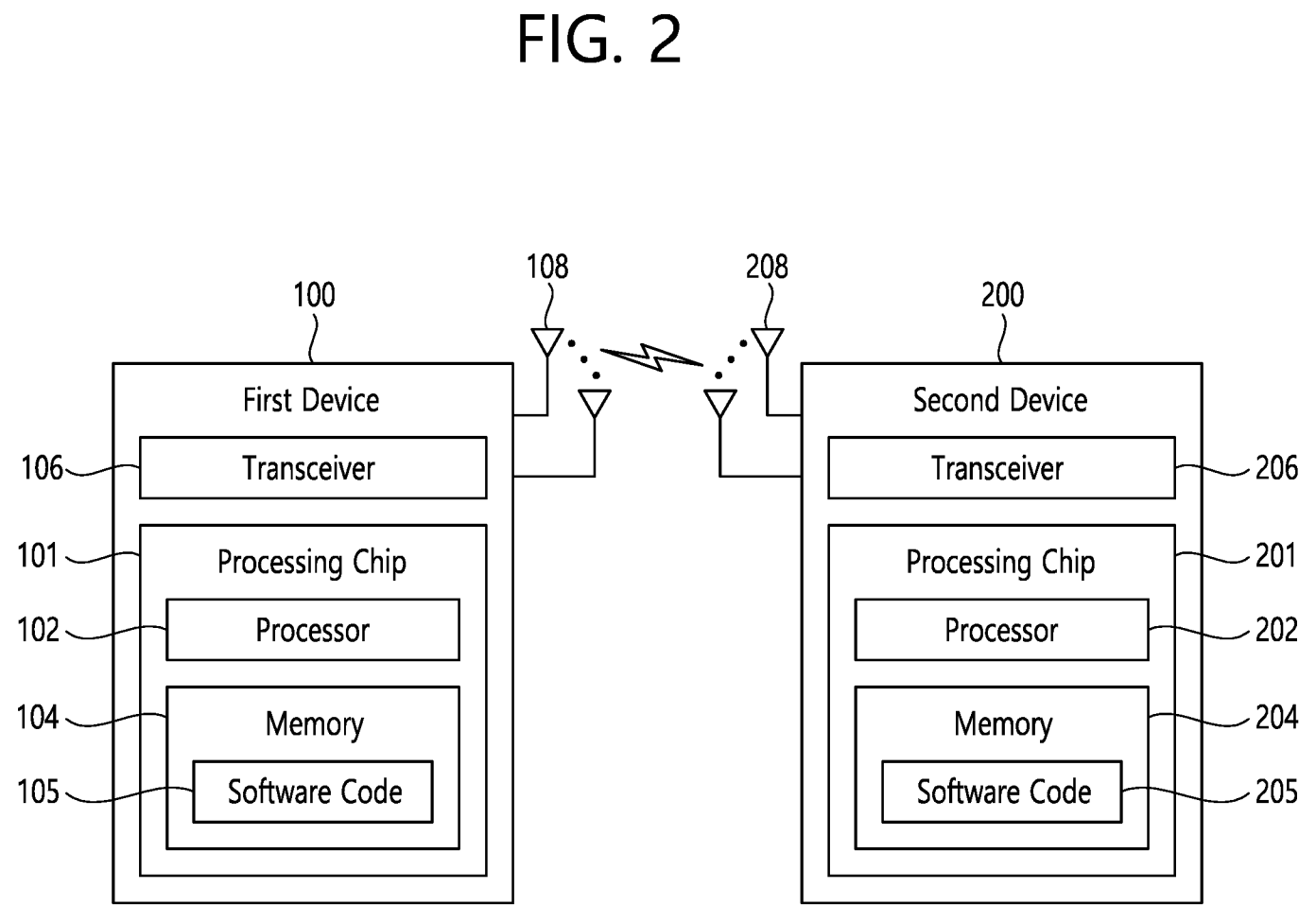

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

FIG. 4 illustrates an example of a structure of an nr system to which the implementation of the present disclosure is applied.

FIG. 4 shows a structure of an NR system, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In the case that a normal CP is used, each slot may include 14 symbols. In the case that an extended CP is used, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Figure 5:
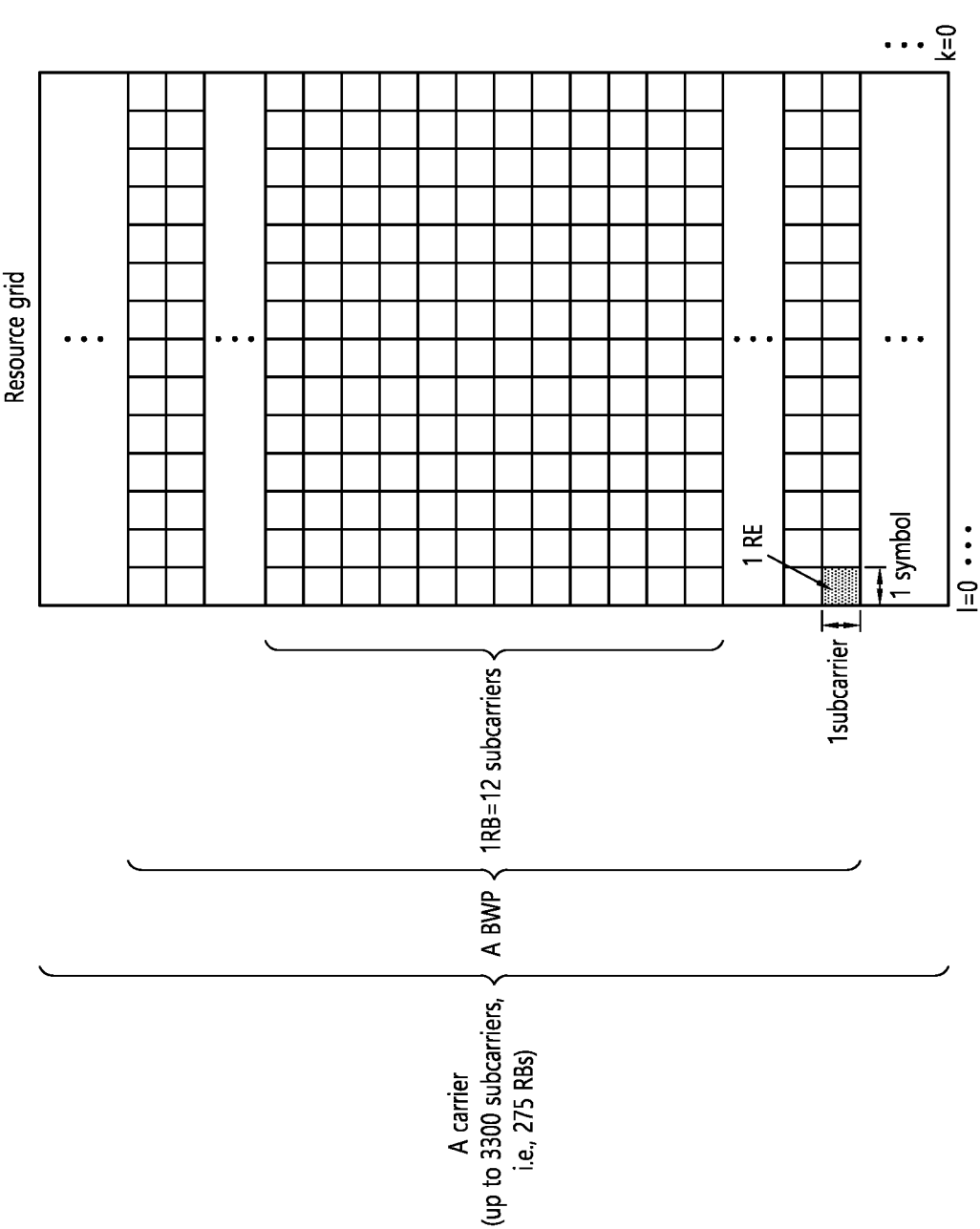
FIG. 5 illustrates an example of a structure of a slot of an NR system to which the implementation of the present disclosure is applied.

FIG. 5 illustrates an example of a structure of a slot of an nr system to which the implementation of the present disclosure is applied.

FIG. 5 shows a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one type of numerology (e.g., SCS, CP length, etc.). A carrier may include a maximum of N BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, V2X or SL communication will be described.

Figure 6A:
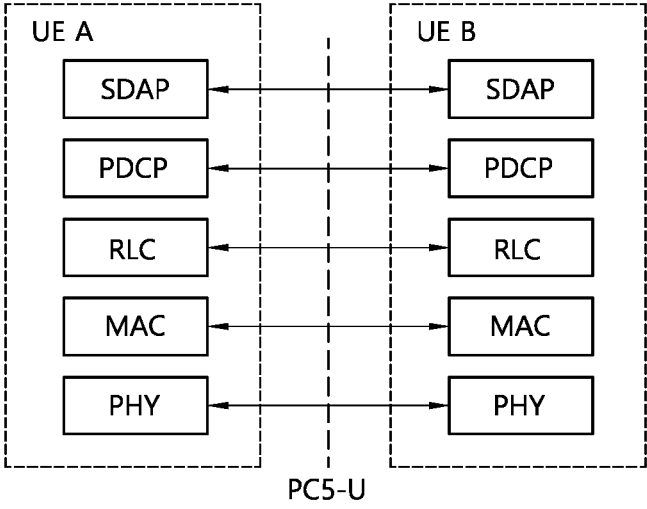
FIGS. 6a and 6b illustrate an example of a radio protocol architecture for a SL communication to which the implementation of the present disclosure is applied.
Figure 6B:
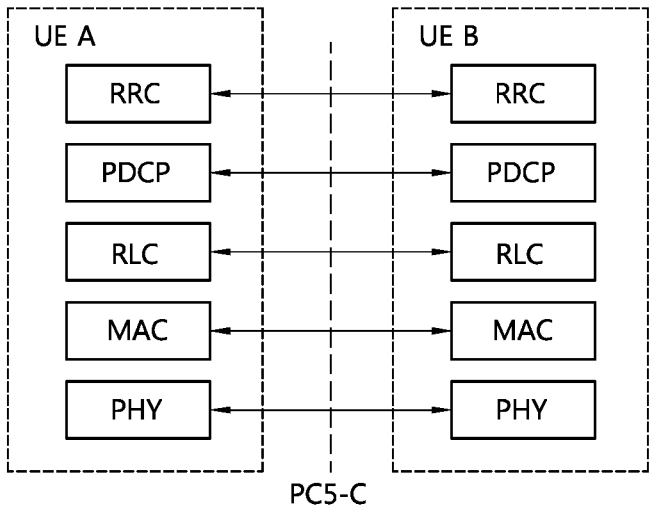

FIGS. 6a and 6b Illustrate an Example of a Radio Protocol Architecture for a SL Communication to which the Implementation of the Present Disclosure is Applied.

FIG. 6a and FIG. 6b show a radio protocol architecture for a SL communication, in accordance with an embodiment of the present disclosure. The embodiment of FIG. 6a and FIG. 6b may be combined with various embodiments of the present disclosure. More specifically, FIG. 6a shows a user plane protocol stack, and FIG. 6b shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which needs to be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
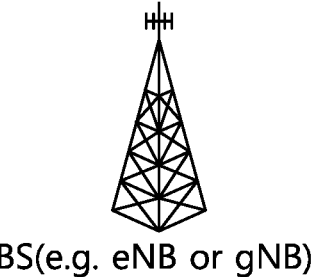
FIG. 7 illustrates an example of a UE performing V2X or SL communication to which the implementation of the present disclosure is applied.
Figure 7:

FIG. 7 illustrates an example of a UE performing V2X or SL communication to which the implementation of the present disclosure is applied.

FIG. 7 shows a UE performing V2X or SL communication, in accordance with an embodiment of the present disclosure. The embodiment of FIG. 7 may be combined with various embodiments of the present disclosure.

Referring to FIG. 7, in V2X or SL communication, the term "terminal" may generally imply a UE of a user. However, in the case that a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, in the case that the UE 1 is within a connectivity range of the BS, the BS may inform the UE 1 of the resource pool. On the other hand, in the case that the UE 1 is out of the connectivity range of the BS, another UE may inform the UE 1 of the resource pool, or the UE 1 may use a pre-configured resource pool.

In general, the resource pool may be configured in units of a plurality of resources, and each UE may select a unit of one or a plurality of resources to use it in SL signal transmission thereof.

Hereinafter, resource allocation in SL will be described.

Figure 8A:
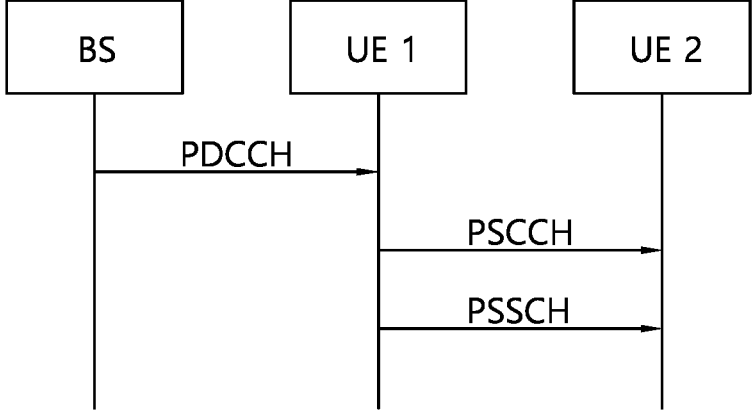
FIGS. 8*a* and 8*b* illustrate an example of a procedure of performing V2X or SL communication by a UE based on a transmission mode to which the implementation of the present disclosure is applied.
Figure 8B:
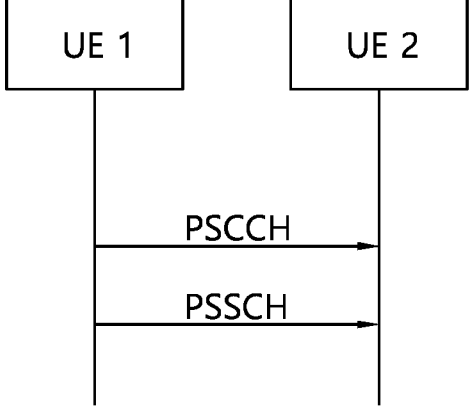

FIGS. 8a and 8b illustrate an example of a procedure of performing V2X or SL communication by a UE based on a transmission mode to which the implementation of the present disclosure is applied.

FIG. 8a and FIG. 8b show a procedure of performing V2X or SL communication by a UE based on a transmission mode, in accordance with an embodiment of the present disclosure. The embodiment of FIG. 8a and FIG. 8b may be combined with various embodiments of the present disclosure. In various embodiments of the present disclosure, the transmission mode may be called a mode or a resource allocation mode. Hereinafter, for the convenience of explanation, in LTE, the transmission mode may be called an LTE transmission mode. In NR, the transmission mode may be called an NR resource allocation mode.

For example, FIG. 8a shows a UE operation related to an LTE transmission mode 1 or an LTE transmission mode 3. Alternatively, for example, FIG. 8a shows a UE operation related to an NR resource allocation mode 1. For example, the LTE transmission mode 1 may be applied to general SL communication, and the LTE transmission mode 3 may be applied to V2X communication.

For example, FIG. 8b shows a UE operation related to an LTE transmission mode 2 or an LTE transmission mode 4. Alternatively, for example, FIG. 8b shows a UE operation related to an NR resource allocation mode 2.

Referring to FIG. 8a, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 8b, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in units of subchannels. In addition, the UE 1 which has autonomously selected the resource within the resource pool may transmit the SCI to the UE 2 through a PSCCH, and thereafter may transmit data based on the SCI to the UE 2 through a PSSCH.

For reference, Table 3 below represents an example of an operating band used for V2X (or SL) communication.

TABLE 3

| Operating Band | V2X Operating Band | V2X UE transmit $F_{UL\_low}$-$F_{UL\_high}$ | V2X UE receive $F_{DL\_low}$-$F_{DL\_high}$ | Duplex Mode | Interface |
|---|---|---|---|---|---|
| 47 | 47 | 5855 MHz-5925 MHz | 5855 MHz-5925 MHz | HD(Half Duplex) | PC5 |

TABLE 3-continued

| Operating Band | V2X Operating Band | V2X UE transmit $F_{UL\_low}$-$F_{UL\_high}$ | V2X UE receive $F_{DL\_low}$-$F_{DL\_high}$ | Duplex Mode | Interface |
|---|---|---|---|---|---|
| 39 | 39 | 1880 MHz-1920 MHz | 1880 MHz-1920 MHz | TDD | PC5 and/ or Uu |

In the case that an operating band 47 according to the example of Table 3 is used for E-UTRA V2X (or SL) communication, the operating band 47 may be referred to as B47. In the case that the operating band 47 according to the example of Table 3 is used for NR V2X (or SL) communication, the operating band 47 may be referred to as n47.

In the case that an operating band 39 according to the example of Table 3 is used for E-UTRA V2X (or SL) communication, the operating band 39 may be referred to as B39. In the case that the operating band 39 according to the example of Table 3 is used for NR V2X (or SL) communication, the operating band 39 may be referred to as n39.

For reference, at least one proposal scheme proposed according to various embodiments of the present disclosure may be applied to not only sidelink communication or V2X communication based on a PC5 interface or an SL interface (e.g., PSCCH, PSSCH, PSBCH, PSSS/SSSS, etc.), but also sidelink communication or V2X communication based on a Uu interface (e.g., PUSCH, PDSCH, PDCCH, PUCCH, etc.).

In the various embodiments of the present disclosure, a receiving operation of a UE may include a decoding operation and/or a receiving operation of a sidelink channel and/or a sidelink signal (e.g., PSCCH, PSSCH, PSFCH, PSBCH, PSSS/SSSS, etc.). In the various embodiments of the present disclosure, a transmitting operation of a UE may include a transmitting operation of a sidelink channel and/or a sidelink signal (e.g., PSCCH, PSSCH, PSFCH, PSBCH, PSSS/SSSS, etc.).

Meanwhile, in the various embodiments of the present disclosure, for example, for the convenience of description, a (physical) channel used for an RX UE to transmit at least one of the following information to a TX UE may be referred to as PSFCH.

SL HARQ Feedback, SL CSI, SL (L1) RSRP

Meanwhile, in the various embodiments of the present disclosure, a Uu channel may include a UL channel and/or a DL channel. For example, the UL channel may include PUSCH, PUCCH, and the like. For example, the DL channel may include PDCCH, PDSCH, and the like. For example, an SL channel may include PSCCH, PSSCH, PSFCH, PSBCH, and the like.

II. Disclosures of the Present Specification

The disclosures described below in the present specification may be implemented in one or more combinations (e.g., a combination including at least one of the contents described below). Each of the drawings shows an embodiment of the present disclosure, but the embodiments of the drawing may be implemented in combination with each other.

The description of the method proposed in the disclosure of the present specification may be composed of a combination of one or more operations/configurations/steps described below. The following methods described below may be performed or used in combination or complementarity.

For reference, in the disclosure of the present specification, sidelink (SL), V2X, V2X sidelink (SL) may have the same meaning.

A terminal performing SL communication may transmit an SL synchronization signal (SLSS) to neighboring terminals. A terminal may start SLSS transmission to synchronize time with neighboring terminals. However, conventionally, an operation for the NR UE to start transmission of SLSS and an operation to stop transmission of SLSS have not been specifically defined. Due to this, there is a problem in that the NR UE cannot efficiently start or stop transmission of SLSS.

The disclosure of the present specification describes operations related to initiation and cease of NR sidelink synchronization signal (SLSS) transmission with reference to various examples.

1. First Disclosure of the Present Specification

The first disclosure of the present specification proposes an operation of a UE related to initiation and cease of FR2 NR sidelink synchronization signal (SLSS) transmission with reference to various examples. The contents described in the first disclosure of the present specification may be applied to sidelink communication. For example, the contents described in the first disclosure of the present specification may be applied to Sidelink services, NR V2X, Public Safety, Device to Device (D2D), commercial use cases, and the like.

The first disclosure of the present specification proposes an example of an operation for a FR2 NR Sidelink (SL) supporting terminal to start its own SLSS transmission to a neighboring terminal and an example of an operation to cease its own SLSS transmission. Here, the FR2 NR SL supporting terminal may mean a wireless communication device supporting FR2 NR SL communication.

A case in which a terminal starts SLSS transmission, may be a case in which a terminal is to synchronize time with a neighboring terminal, when the terminal is in an environment where time synchronization with neighboring terminals is out of sync. In other words, in an environment where time synchronization with neighboring terminals is out of sync, in order to match time synchronization with neighboring terminals, the terminal may transmit SLSS to the neighboring terminals. For example, device A may start SLSS transmission. Then, by detecting the SLSS of device A, device B nay match (synchronize) time synchronization with each other (e.g., time synchronization of device A and device B). And, device A and device B can perform SL communication.

Conversely, a case in which a terminal stops SLSS transmission may be a case in which a neighboring terminal uses the same synchronization timing source as itself. For example, when device A and device B use the same gNB as a synchronization timing source, device A may not need to transmit SLSS to synchronize time with device B. This is because the time synchronization of device A and device B already coincides because the same gNB is a synchronization timing source.

As such, SLSS transmission may not always be performed. For example, SLSS transmission may be started or stopped depending on the environment. To this end, UE operations for starting SLSS transmission and stopping SLSS transmission must be clearly defined. The first disclosure of the present specification describes various examples of UE operations for starting SLSS transmission and ceasing SLSS transmission.

i) Case 1

In the case of a terminal supporting FR1 SL communication, based on Rel-16 NR V2X terminal operation (3GPP TS38.133 V16.3.0), the following example may be performed.

Initiation/Cease of SLSS Transmissions will be described.

In the case of the following example, the description of initiation/cease of SLSS transmission may be applied to NR V2X sidelink communication, public safety, D2D (device to device), commercially available UE:

when GNSS is used as a synchronization reference source;

when an NR cell is used as a synchronization reference source;

when an EUTRAN cell is used as a synchronization reference source;

when a SyncRef UE is used as a synchronization reference source.

i-1) Case 1-1

In Case 1-1, initiation/cease of SLSS transmission when the NR cell is a synchronization reference source is described.

The requirements described below may be applied when the NR cell is used as a synchronization reference source and the UE satisfies the following conditions:

when the UE is out of coverage on the NR sidelink carrier and the UE is in-coverage with a serving cell on a NR non-sidelink carrier;

a condition for SLSS transmission (e.g., a condition for SLSS transmission in 3GPP TS 38.331 V16.1.0) is satisfied;

networkControlledSyncTx is not set; and syncTxThreshIC is included in a System Information Block (SIB) (e.g., SystemInformationBlockType12).

Here, when networkControlledSyncTx is set, whether or not the terminal transmits SLSS may be controlled by the network. syncTxThreshIC may mean an in-coverage threshold. When networkControlledSyncTx is not set, the terminal can directly control whether to transmit SLSS. The UE may measure the RSRP of the serving cell and compare the measured RSRP with syncTxThreshIC. If RSRP<syncTxThreshIC, the UE may transmit SLSS.

To initiate/cease SLSS transmission, the UE can measure and evaluate the RSRP of the cell used as a synchronization reference source within $T_{evaluate,SLSS}$. Here, $T_{evaluate,SLSS}$ may mean, for example, an evaluation period for performing measurements related to initiation/cease of SLSS transmission.

Hereinafter, an example of a case where the FR1 NR cell is a synchronization reference source and an example of a case where the FR2 NR cell is a synchronization reference source will be described.

i-1-a) for FR1 NR Cell as Synchronization Reference Source

Hereinafter, the FR1 NR cell may be a synchronization reference source. In this case, $T_{evaluate,\ SLSS}$ as in the following example may be applied.

For example, when the FR1 NR cell is a synchronization reference source, $T_{evaluate,SLSS}$ may be the same as the example of Table 4 or Table 5.

As an example, for the synchronization reference source FR1 NR cell, when the UE performs SSB-based measurement without a measurement gap, $T_{evaluate,SLSS}$ may be the same as the example of Table 4.

TABLE 4

| DRX cycle in NR cell | $T_{evaluate,\ SLSS}$ |
|---|---|
| No DRX | max(400 ms, ceil(2 × 5 × $K_p$) × SMTC period) (Note 1 is applied) |
| DRX cycle ≤ 320 ms | max(400 ms, ceil(1.5 × 2 × 5 × $K_p$) × max (SMTC period, DRX cycle)) |
| DRX cycle > 320 ms | ceil(7 × $K_p$) × DRX cycle |

The example in Table 4 shows an example of $T_{evaluate,SLSS}$ for measurement without a measurement gap when the NR cell is used as a synchronization reference source in FR1.

For reference, the SSB Measurement Time Configuration (SMTC) period may mean the period of the SMTC window. A Discontinuous Reception (DRX) cycle may mean DRX. Kp may be '1' when intra-frequency SMTC is fully non-overlapped or fully overlapped with MG. When Kp is partially overlapped with MG, if SMTC period<MGRP, Kp=1/(1−(SMTC period/MGRP)) can be defined. For example, in the case of partially overlapped, if the SMTC period=40 ms and MGRP=80 ms, it may be Kp=2. This may mean that the time increases by about two times, considering the overlapped portion of the MG and the interval measuring the RSRP of the actual serving cell.

In the example of Table 4, NOTE 1 may mean the following. When different SMTC cycles are set for different cells, in the example of Table 4, the SMTC cycle may mean the SMTC cycle used in the identified cell.

As another example, for the synchronization reference source FR1 NR cell, when the UE performs SSB-based measurement using a measurement gap, $T_{evaluate,SLSS}$ may be the same as the example of Table 5.

TABLE 5

| DRX cycle in NR cell | $T_{evaluate,\ SLSS}$ |
|---|---|
| No DRX | max(400 ms, 2 × 5 × max(MGRP, SMTC period)) × $CSSF_{intra}$ |
| DRX cycle ≤ 320 ms | max(400 ms, ceil(2 × 1.5 × 5) × max(MGRP, SMTC period, DRX cycle)) × $CSSF_{intra}$ |
| DRX cycle > 320 ms | 7 × max(MGRP, DRX cycle) × $CSSF_{intra}$ |

The example in Table 5 shows an example of $T_{evaluate,SLSS}$ for measurement with measurement gaps when the NR cell is used as the synchronization reference source in FR1.

For reference, in the example of Table 5, MGRP may mean Meas Gap Repetition Period. $CSSF_{intra}$ may mean a carrier specific scaling factor.

If higher layer filtering is configured, additional delay may be expected in evaluating initiation/cease of SLSS transmission.

i-1-b) for FR2 NR Cell as Synchronization Reference Source

Hereinafter, the FR2 NR cell may be a synchronization reference source.

In general, compared to the FR1 NR cell, the size of the FR2 NR Cell (e.g., the communication radius of the FR2 NR cell) is considered very small (e.g., the cell radius of 150 m). Considering the small cell radius of the FR2 NR Cell and the movement speed of the UE, it may frequently occur that the UE leaves the cell before the evaluation time (e.g., $T_{evaluate, SLSS}$) for starting and ceasing SLSS transmission has expired. In this case, stability of operations related to initiation and cease of SLSS transmission of the UE may not be guaranteed. That is, it may lead to inefficient results. For example, a problem may occur in that the terminal inefficiently determines initiation and cease of SLSS transmission. Therefore, when FR2 NR Cell is set as a synchronization reference source, regarding SLSS transmission of the terminal, the following various examples (e.g., proposals 1 to 4) are proposed.

Proposal 1: When the FR2 NR Cell is set as a synchronization reference source, the UE can always transmit the SL SS.

Proposal 2: When the FR2 NR Cell is configured as a synchronization reference source, if the movement speed of the UE is high (or fast), the UE can always transmit the SL SS.

Proposal 3: When FR2 NR Cell is set as a synchronization reference source, if the movement speed of the terminal is small (or slow), the terminal may compare/evaluate the DL RSRP measurement value and a threshold (e.g., syncTxThreshIC) to start and/or stop transmission of SLSS.

Proposal 4: When FR2 NR Cell is set as a synchronization reference source, the terminal compares/evaluates the DL RSRP measurement value and the threshold (e.g., syncTxThreshIC), and the terminal may perform operation of starting and/or stopping transmission of SLSS.

When the FR2 NR Cell is a synchronization reference source, the UE may apply a combination of one or more of proposals 1 to 4 described above. For example, proposals 2 and 3 may be combined. For example, if the movement speed of the terminal is high, the terminal always transmits SLSS, if the mobile speed of the UE is low, the UE may compare/evaluate the DL RSRP measurement value and the threshold to start and/or stop transmission of SLSS.

In Proposals 2 and 3, a threshold value related to the speed may be used as a criterion for the movement speed of the UE. For example, in proposals 2 and 3, the signaling 'sl-ThresUE-Speed-r16' value may be used as the mobile speed criterion of the UE. The base station may transmit information about a speed-related threshold (e.g., 'sl-ThresUE-Speed-r16') to the terminal. The terminal may compare the movement speed of the terminal with a threshold value to determine whether the movement speed of the terminal is fast (great) or slow (small). For example, the terminal may determine as in the following example:

movement speed of the terminal<sl-ThresUE-Speed-r16: the terminal determines that the movement speed is low; and movement speed of the terminal≥sl-ThresUE-Speed-r16: the terminal determines that the movement speed is fast.

For reference, the 'sl-ThresUE-Speed-r16' value may be included in configuration information related to PSSCH transmission (e.g., SL-PSSCH-TxConfig-r16) as shown in the example of Table 6.

TABLE 6

| SL-PSSCH-TxConfig-r16 ::= SEQUENCE { | |
|---|---|
| sl-TypeTxSync-r16 | SL-TypeTxSync-r16 OPTIONAL, -- Need R |
| sl-ThresUE-Speed-r16 | ENUMERATED {kmph60, kmph80, kmph100, kmph120, |
| kmph140, kmph160, kmph180, kmph200}, | |
| sl-Parameters AboveThres-r16 | SL-PSSCH-TxParameters-r16, |
| sl-ParametersBelowThres-r16 | SL-PSSCH-TxParameters-r16, |
| ... | |
| } | |

In the example of Table 6, kmph60, kmph80, kmph100, kmph120, kmph140, kmph160, kmph180, and kmph200 may mean examples of speed values, respectively. kmph may mean km per hour. kmph60 may mean 60 km/hour.

An example of an operation performed by the UE in proposal 3 may be as follows. In proposal 3, when the FR2 NR Cell is set as a synchronization reference source, the UE's SLSS transmission initiation and ceaseoperations may be performed when the following conditions are satisfied.

Requirements related to proposal 3 may be applied when the NR cell is used as a synchronization reference source and the UE satisfies the following conditions:

When the UE is out of coverage on the NR sidelink carrier and in coverage with the serving cell on the NR non-sidelink carrier, and And, if the following conditions for SLSS transmission are satisfied:

networkControlledSyncTx is not set;

when syncTxThreshIC is included in a System Information Block (SIB) (eg SystemInformationBlockType12); and absolute speed of UE<sl-ThresUE-Speed-r16.

For proposal 3, if the conditions as in the example above are satisfied, to start/stop SLSS transmission, the UE can measure and evaluate the RSRP of a cell used as a synchronization reference source within $T_{evaluate,\ SLSS}$.

An example of an operation performed by the UE in proposal 4 may be as follows. In proposal 4, when the FR2 NR Cell is set as a synchronization reference source, the UE's SLSS transmission initiation and ceaseoperations may be performed when the following conditions are satisfied.

When the UE is out of coverage on the NR sidelink carrier and in coverage with the serving cell on the NR non-sidelink carrier, and And, if the following conditions for SLSS transmission are satisfied:

networkControlledSyncTx is not set; and when syncTxThreshIC is included in a System Information Block (SIB), such as SystemInformationBlockType12.

For proposal 4, if the conditions as in the above example are satisfied, in order to initiation/cease SLSS transmission, the UE may measure and evaluate the RSRP of a cell used as a synchronization reference source in $T_{evaluate,SLSS}$.

Regarding the example of proposal 3 and the example of proposal 4, the following description may be applied. In proposals 3 and 4, in order to perform operations related to the initiation and cease of SLSS transmission, the terminal may compare/evaluate the DL RSRP measurement value and the threshold (eg syncTxThreshIC) during the evaluation time ($T_{evaluate,\ SLSS}$). After comparing the DL RSRP measurement value and the threshold (eg syncTxThreshIC), the terminal may perform the following example operation:

DL RSRP measurement value (e.g., Measured DL RSRP) ≤syncTxThreshIC: the terminal starts SLSS transmission; or DL RSRP measurement value (eg Measured DL RSRP) ≥syncTxThreshIC: the terminal stops SLSS transmission.

The evaluation time (e.g. $T_{evaluate,\ SLSS}$) for the example of proposal 3 and example of proposal 4 is divided into cases with and without measurement gaps, and suggestions as shown in the examples in Table 7 and Table 8 below.

If there is no Measurement Gap, the evaluation time (e.g., $T_{evaluate,\ SLSS}$) for the example of proposal 3 and example of proposal 4 is proposed as shown in Table 7, based on the FR2 NR measurement period for intra-frequency measurements without gaps standard.

TABLE 7

| DRX cycle | $T_{evaluate, SLSS}$ |
|---|---|
| No DRX | $\max(A \times 400$ ms, $\mathrm{ceil}(B \times M_{meas\_period\_w/o\_gaps} \times K_p \times K_{layer1\_measurement}) \times$ SMTC period$) \times$ CSS-$F_{intra}$ (Note 1 is applied) |
| DRX cycle ≤ 320 ms | $\max(A \times 400$ ms, $\mathrm{ceil}(C \times 1.5 \times M_{meas\_period\_w/o\_gaps} \times K_p \times K_{layer1\_measurement}) \times \max($SMTC period, DRX cycle$)) \times \mathrm{CSSF}_{intra}$ |
| DRX cycle > 320 ms | $\mathrm{ceil}(D \times M_{meas\_period\_w/o\_gaps} \times K_p \times K_{layer1\_measurement}) \times$ DRX cycle $\times \mathrm{CSSF}_{intra}$ |

The example in Table 7 shows an example of $T_{evaluate,SLSS}$ for measurement without a measurement gap when a FR2 NR cell is used as a synchronization reference source.

In the example of Table 7, NOTE 1 may mean the following. When different SMTC period are set for different cells, in the example of Table 7, the SMTC period may mean an SMTC period used in the identified cell.

If there is a Measurement Gap, the evaluation time (e.g. $T_{evaluate, SLSS}$) for the example of proposal 3 and example of proposal 4 is based on the FR2 NR measurement period for intra-frequency measurements with gaps standard, Table 8 is suggested as an example.

TABLE 8

| DRX cycle | $T_{evaluate, SLSS}$ |
|---|---|
| No DRX | $\max(A \times 400$ ms, $B \times M_{meas\_period\ with\_gaps} \times \max($MGRP, SMTC period$)) \times \mathrm{CSSF}_{intra}$ |
| DRX cycle ≤ 320 ms | $\max(A \times 400$ ms, $\mathrm{ceil}(C \times 1.5 \times M_{meas\_period\ with\_gaps}) \times \max($MGRP, SMTC period, DRX cycle$)) \times \mathrm{CSSF}_{intra}$ |
| DRX cycle > 320 ms | $D \times M_{meas\_period\ with\_gaps} \times \max($MGRP, DRX cycle$) \times \mathrm{CSSF}_{intra}$ |

The example in Table 8 shows an example of $T_{evaluate,SLSS}$ for measurement with a measurement gap when a FR2 NR cell is used as a synchronization reference source.

In the examples of Table 7 and Table 8, considering the small cell size of the FR2 cell and the mobile speed of the UE, to avoid $T_{evaluate,SLSS}$ being too large, A, B, C and D are proposed as in the following example:

to be applied to proposal 3, {A, B, C, D}={1, 2, 2, 1.5} or {1, 2, 2, 2} or {2, 2, 2, 1.5} or {2, 2, 2, 2};

to be applied to proposal 4, {A, B, C, D}={1, 1.5, 1.5, 1.5} or {2, 1.5, 1.5, 1.5} or {1, 2, 2, 1.5} or {1, 2, 2, 2} or {2, 2, 2, 1.5} or {2, 2, 2, 2}.

A, B, C, and D suggested above are just examples, In the disclosure of the present specification, the scope for A, B, C, and D applied to the example of proposal 3 and the example of proposal 4 are not limited by the above example.

In other words, because the size of the FR2 cell is small, if the $T_{evaluate,SLSS}$ value is too large, while the UE performs evaluation to initiation/cease SLSS transmission, a moving terminal may leave the FR2 cell. In order to prevent this problem from occurring, A, B, C, and D to be applied to the example of proposal 3 and/or the example of proposal 4 are proposed as in the above example.

The various parameters included in the examples of Table 7 and the examples of Table 8 can be defined as in the following examples:

$T_{evaluate,SLSS}$ when the UE performs SSB-based measurement without a measurement gap is shown in the example of Table 7.

when the UE performs SSB-based measurement using the measurement gap, $T_{evaluate,\ SLSS}$ is shown in the example of Table 8.

$M_{meas\_period\_w/o\_gaps}$: For UEs supporting power class 1, $M_{meas\_period\_w/o\_gaps}$=40. For UEs supporting FR2 power class 2, $M_{meas\_period\_w/o\_gaps}$=24. For UEs supporting power class 3, $M_{meas\_period\_w/o\_gaps}$=24. For UEs supporting power class 4, $M_{meas\_period\_w/o\_gaps}$=24. For UEs supporting FR2 SL, $M_{meas\_period\_w/o\_gaps}$ value for UEs supporting FR2 Power Class 2 ($M_{meas\_period\_w/o\_gaps}$=24) may be applied.

$M_{meas\_period\_with\_gaps}$: For UEs supporting power class 1, $M_{meas\_period\_with\_gaps}$=40. For UEs supporting power class 2, $M_{meas\_period\_with\_gaps}$=24. For UEs supporting power class 3, $M_{meas\_period\_with\_gaps}$=24. For UEs supporting power class 4, $M_{meas\_period\_with\_gaps}$=24. For a UE supporting FR2 SL, an $M_{meas\_period\_with\_gaps}$ value ($M_{meas\_period\_with\_gaps}$=24) for a UE supporting FR2 power class 2 may be applied.

Kp=1: When the intra-frequency SMTC does not completely overlap the measurement gap or the intra-frequency SMTC completely overlaps the MG.

Kp=1/(1−(SMTC period/MGRP)): If SMTC period<MGRP, and intra-frequency SMTC partially overlaps the measurement gap.

$K_{layer1\_measurement}$=1: $K_{layer1\_measurement}$=1 in the following cases:

When all reference signals, for beam reporting on any FR2 serving frequency in the same band outside the measurement gap, configured for Radio Link Monitoring (RLM), Beam Failure Detection (BFD) (e.g., BFD may mean detecting a beam missed event), Candidate Beam Detection (CBD) (e.g., CBD may mean detecting a candidate beam, which is an intermediate step for detecting a beam again after BFD), or Layer 1-Reference Signal Received Power (L1-RSRP) do not completely overlap by intra-frequency SMTC occasion, or when all reference signals configured for RLM, BFD, CBD or L1-RSRP for beam reporting on any FR2 serving frequency in the same band outside the measurement gap are completely overlapped by intra-frequency SMTC occasion, and all reference signal configured for RLM, BFD, CBD or L1-RSRP for beam reporting on any FR2 serving frequency in the same band outside the measurement gap do not overlap with any of SSB symbols and RSSI symbols, 1 symbol before consecutive SSB symbols and RSSI symbols, and 1 symbol after consecutive SSB symbols and RSSI symbols (Here, when SSB-ToMeasure and SS-RSSI-Measurement are set, the SSB symbol is indicated by SSB-ToMeasure and the RSSI symbol is indicated by SS-RSSI-Measurement).

In other cases, $K_{layer1\_measurement}$=1.5.

$\mathrm{CSSF}_{intra}$: This is a carrier specific scaling factor. CSS-$F_{intra}$ can be determined according to the following example:

$\mathrm{CSSF}_{intra}$ may be determined based on $\mathrm{CSSF}_{outside\_gap,i}$ of clause 9.1.5.1 in 3GPP TS38.133 V16.3.0 for measurements performed outside the measurement gap. For example, when the intra-frequency SMTC does not overlap at all or has some overlap with the measurement gap. or $\mathrm{CSSF}_{intra}$ may be determined according to $\mathrm{CSSF}_{within\_gap,i}$ of clause 9.1.5.1 in 3GPP TS38.133 V16.3.0 for measurements performed inside the measurement gap. For example, when the intra-frequency SMTC completely overlaps the measurement gap.

The period of Intra-frequency SMTC occasions (e.g., SMTC period) may be as in the following example:

When higher layer signaling smtc2 of 3GPP TS 38.331 V16.1.0 is set, the period of Intra-frequency SMTC occasions may correspond to the value of higher layer parameter smtc2;

In other cases, the period of Intra-frequency SMTC occasions may correspond to the value of the higher layer parameter smtc1.

If higher layer filtering is configured, an additional delay in evaluation to initiate/cease SLSS transmissions can be expected i-2) Case 1-2

In Case 1-2, initiation/cease of SLSS transmission when an EUTRAN cell is a synchronization reference source is described.

The requirements described below may be applied when an EUTRAN cell is used as a synchronization reference source and the UE satisfies the following conditions:

when the UE is out of coverage on the NR sidelink carrier and in coverage with the serving cell on the LTE non-sidelink carrier;

A condition for SLSS transmission (e.g., a condition for SLSS transmission in 3GPP TS 38.331 V16.1.0) is satisfied;

networkControlledSyncTx is not set; and

When syncTxThreshIC is included in a System Information Block (SIB) (e.g., such as SystemInformationBlockType28).

To initiation/cease SLSS transmission, the UE can measure and evaluate the RSRP of the cell used as the vaporization reference source within $T_{evaluate,SLSS}$.

Here, $T_{evaluate,SLSS}$ may be as in the following example:

If DRX is not configured for the UE, $T_{evaluate,SLSS}=0.4$ seconds.

When DRX is configured for the UE, $T_{evaluate,SLSS}$ may be the same as the example of Table 9.

TABLE 9

| DRX cycle length in EUTRAN cell[s] | $T_{evaluate,\ SLSS}$ [s] (number of DRX cycles) |
|---|---|
| ≤0.04 | 0.4 (Note 1) |
| 0.04 < DRX-cycle ≤ 0.56 | Note 2 (6) |

The example of Table 9 shows an example of $T_{evaluate,SLSS}$ when an EUTRAN cell is used as a synchronization reference source.

In the example of Table 9, Note 1 means that the number of DRX cycles may vary depending on the DRX cycle in use. NOTE 2 means that the time may vary depending on the DRX cycle in use.

If higher layer filtering is configured, additional delay may be expected in evaluating initiation/cease of SLSS transmission.

i-3) Case 1-3

In Case 1-3, initiation/cease of SLSS transmission when GNSS is a synchronization reference source is described.

The requirements described below may be applied when GNSS is used as a synchronization reference source and the UE satisfies the following conditions:

When the UE is out of coverage on the NR sidelink carrier and in coverage with a serving cell on a non-sidelink carrier;

A condition for SLSS transmission (e.g., a condition for SLSS transmission in 3GPP TS 38.331 V16.1.0) is satisfied;

networkControlledSyncTx is not set; and syncTxThreshIC is included in a System Information Block (SIB) (e.g., SystemInformationBlockType12).

Alternatively, the requirements described below may be applied when GNSS is used as a synchronization reference source and the UE satisfies the following conditions:

when the UE is out of coverage on the NR sidelink carrier and in coverage with the serving cell on the LTE non-sidelink carrier;

A condition for SLSS transmission (e.g., a condition for SLSS transmission in 3GPP TS 38.331 V16.1.0) is satisfied;

networkControlledSyncTx is not set; and syncTxThreshIC is included in a System Information Block (SIB) (e.g., SystemInformationBlockType28).

When the serving cell is an NR cell, the contents (e.g., requirements) described in Case 1-1 above may be applied.

If the serving cell is an EUTRAN cell, the contents (eg requirements) described in Case 1-2 above may be applied.

i-4) Case 1-4

In Case 1-4, the initiation/cease of SLSS transmission when the SyncRef UE is a synchronization reference source is described.

The requirements described below may be applied when a SyncRef UE is used as a synchronization reference source and the UE satisfies the following conditions:

when the UE is in any cell selection state, or when the UE is out of coverage on a NR sidelink carrier and associated with a serving cell on a non-sidelink carrier;

A condition for SLSS transmission (e.g., a condition for SLSS transmission in 3GPP TS 38.331 V16.1.0) is satisfied;

SyncRef UE is used as a synchronization reference source; and

When syncTxThreshOoC is included within the preset V2X parameters.

syncTxThreshOoC may mean a threshold used in out of coverage. The terminal may measure RSRP of a neighboring terminal (e.g., SyncRef UE) and compare the measured RSRP with syncTxThreshOoC. If the RSRP of a neighbor terminal (e.g., SyncRef UE)<syncTxThreshOoC, the terminal may transmit SLSS.

To initiation/cease SLSS transmission, the UE measures the PSBCH-RSRP of the SyncRef UE selected as the synchronization reference source and evaluate it within $T_{evaluate,SLSS}$ ($T_{evaluate,SLSS}=4$ S-SSB periods).

If higher layer filtering is configured, additional delay may be expected in evaluating initiation/cease of SLSS transmission.

ii) Case 2

In the case of a terminal supporting FR2 SL communication, operations such as the following examples may be performed.

Initiation/Cease of SLSS Transmissions will be described.

In the case of the following example, the description of initiation/cease of SLSS transmission may be applied to NR V2X sidelink communication, public safety, D2D (device to device), commercially available UE:

when GNSS is used as a synchronization reference source;

when an NR cell is used as a synchronization reference source;

when an EUTRAN cell is used as a synchronization reference source;

when a SyncRef UE is used as a synchronization refer-
ence source.

ii-1) Case 2-1

In Case 2-1, initiation/cease of SLSS transmission when
the NR cell is a synchronization reference source is
described.

When the FR2 SL supporting terminal uses NR Cell as a
synchronization reference source, it is proposed to equally
apply the operation of the terminal described in the example
of Case 1-1 above.

ii-2) Case 2-2

In Case 2-2, initiation/cease of SLSS transmission when
an EUTRAN cell is a synchronization reference source is
described.

When the FR2 SL supporting terminal uses the EUTRAN
Cell as a synchronization reference source, it is proposed to
equally apply the operation of the terminal described in the
example of Case 1-2 above.

ii-3) Case 2-3

In Case 2-3, initiation/cease of SLSS transmission when
GNSS is a synchronization reference source is described.

When the serving cell of the FR2 SL supporting terminal
is an NR cell, it is proposed to apply the same operation of
the terminal described in the example of Case 2-1 above.

When the serving cell of the FR2 SL supporting UE is an
EUTRAN cell, it is proposed to apply the same operation of
the UE described in the example of Case 2-2 above.

ii-4) Case 2-4

In Case 2-4, the initiation/cease of SLSS transmission
when the SyncRef UE is a synchronization reference source
is described.

For FR2 SL supported terminals, for SL RSRP (PSBCH-
RSRP) evaluation time for initiation and cease of SLSS
transmission, a beam may be considered. This is because
beam management according to beamforming can be used
for FR2 SL communication. For reference, $T_{evaluate,SLSS}=4$
S-SSB periods in FR1 SyncRef UE are standardized (S-SSB
period=160 ms).

Assuming that SL beam management is applied to the
FR2 SL terminal and N beams are operated, for example,
evaluation time can be defined as $T_{evaluate,SLSS}=N\times4$ S-SSB
periods. Considering that the FR2 terminal can operate 4 to
8 beams, $T_{evaluate,SLSS}=16$ S-SSB periods to 32 S-SSB
periods are proposed. As an example, $T_{evaluate,SLSS}=24$
S-SSB cycles (3840 ms) are proposed.

The requirements described below may be applied when
SL beam management is used, a FR2 SyncRef UE is used as
a synchronization reference source, and the UE satisfies the
following conditions:

when the UE is in any cell selection state, or when the UE
is out of coverage on a NR sidelink carrier and asso-
ciated with a serving cell on a non-sidelink carrier;

A condition for SLSS transmission (e.g., a condition for
SLSS transmission in 3GPP TS 38.331 V16.1.0) is
satisfied;

SyncRef UE is used as a synchronization reference
source; and

When syncTxThreshOoC is included within the preset
V2X parameters.

To initiation/cease SLSS transmission, the UE measures
the PSBCH-RSRP of the SyncRef UE selected as the
synchronization reference source and evaluate it within
$T_{evaluate,SLSS}$ ($T_{evaluate,SLSS}=24$ S-SSB periods). Here, 24
S-SSB periods are just examples, the scope of the disclosure
of the present specification may include the above-described
$T_{evaluate,SLSS}=N\times4$ S-SSB period as $T_{evaluate,SLSS}$.

If higher layer filtering is configured, additional delay
may be expected in evaluating initiation/cease of SLSS
transmission.

Considering the movement speed of the UE, $T_{evaluate,SLSS}$
time N times greater than $T_{evaluate,SLSS}$ in FR1 may not be
desirable. $T_{evaluate}$, to reduce SLSS time, in the case of FR2
SL terminals, it is proposed that more than M (integer with
M≥2) SLSSs are basically set (or allocated) in the S-SSB.
For example, a SycnRef UE supporting FR2 SL may trans-
mit M or more SLSSs in one S-SSB. In this case, the
evaluation time ($T_{evaluate,~SLSS}$) can be defined as
$T_{evaluate,~SLSS}=(N/M)\times4$ S-SSB periods.

An example of evaluation time ($T_{evaluate,~SLSS}$) can be:

Assuming N=4~8 and M=2, $T_{evaluate,SLSS}=8$ S-SSB peri-
ods~16 S-SSB periods. As an example,
$T_{evaluate,~SLSS}=12$ S-SSB periods (1920 ms) are pro-
posed.

Assuming N=4~8 and M=2, $T_{evaluate,SLSS}=8$ S-SSB peri-
ods~16 S-SSB periods. As an example,
$T_{evaluate,~SLSS}=12$ S-SSB periods (1920 ms) are pro-
posed.

On the other hand, in the FR2 SL terminal, when SL beam
management is not applied, for FR2 SL terminals, it is
suggested to use the same evaluation time (eg $T_{evaluate,}$
$_{SLSS}=4$ S-SSB cycles) of FR1 SL terminals. For example, in
this case, the contents described in the examples of Cases
1-4 may be applied.

In the requirements described below may be applied,
when SL beam management is not used, FR2 SyncRef UE
is used as synchronization reference source, and the UE
satisfies the following conditions:

when the UE is in any cell selection state, or when the UE
is out of coverage on a NR sidelink carrier and asso-
ciated with a serving cell on a non-sidelink carrier;

A condition for SLSS transmission (e.g., a condition for
SLSS transmission in 3GPP TS 38.331 V16.1.0) is
satisfied;

SyncRef UE is used as a synchronization reference
source; and

When syncTxThreshOoC is included within the preset
V2X parameters.

To initiation/cease SLSS transmission, the UE measures
the PSBCH-RSRP of the SyncRef UE selected as the
synchronization reference source and evaluate it within
$T_{evaluate,SLSS}$ ($T_{evaluate,SLSS}=4$ S-SSB periods).

If higher layer filtering is configured, additional delay
may be expected in evaluating initiation/cease of SLSS
transmission.

The following drawings are made to explain a specific
example of the present specification. Since the names of
specific devices or names of specific signals/messages/fields
described in the drawings are provided as examples, the
technical features of the present specification are not limited
to the specific names used in the drawings below.

Figure 9A:
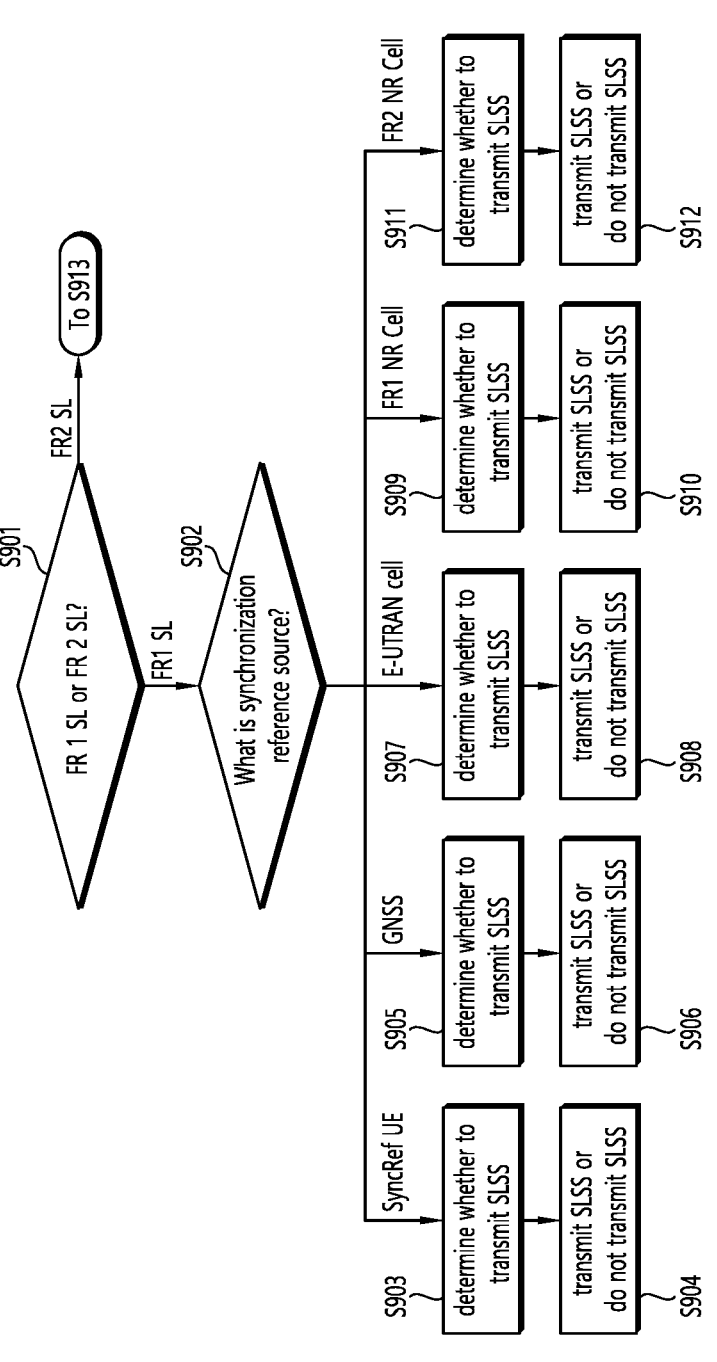
FIGS. 9*a* and 9*b* illustrate an example of an operation of a terminal according to an embodiment of the first disclosure of the present specification.
Figure 9B:
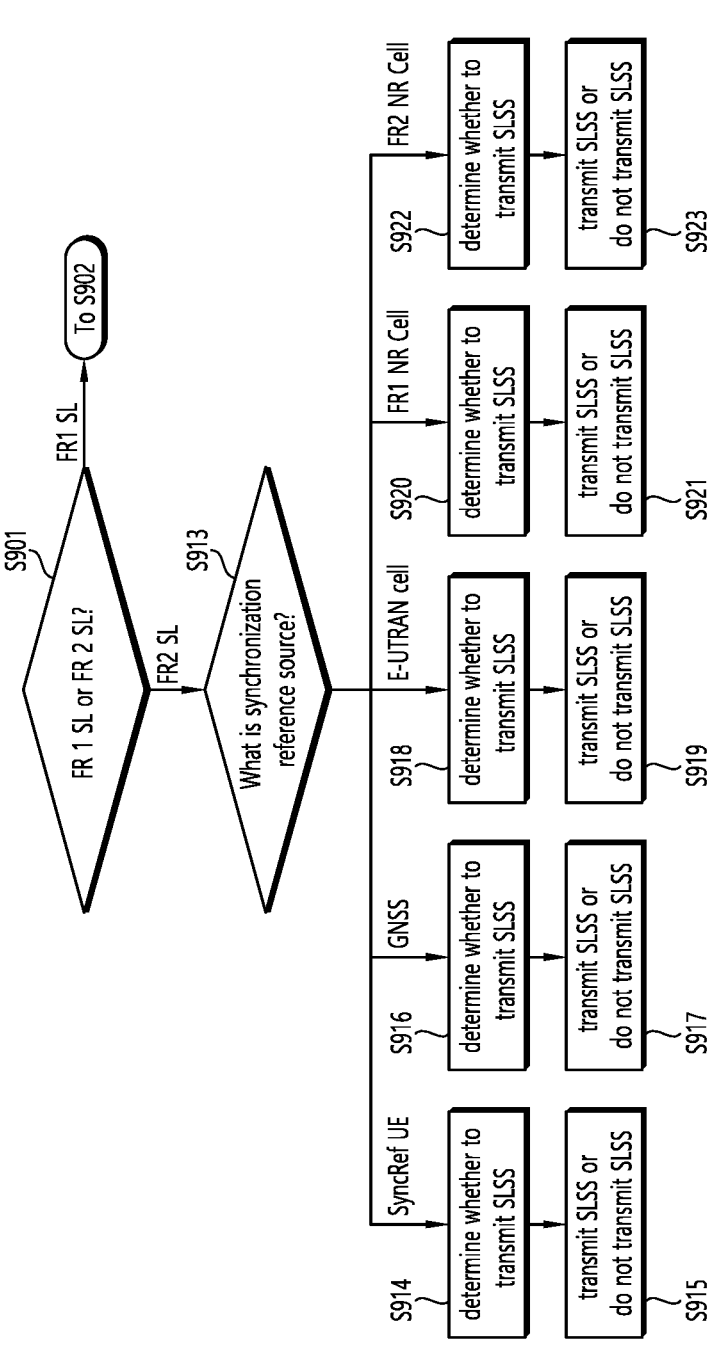

FIGS. 9a and 9b illustrate an example of an operation of
a terminal according to an embodiment of the first disclosure
of the present specification.

FIGS. 9a and 9b show an example of an operation of a
terminal according to the first disclosure of the present
specification. The contents shown in FIGS. 9a and 9b are
merely examples, and the scope of the disclosure of the
present specification is not limited by FIGS. 9a and 9b.

The terminal may perform operations according to vari-
ous examples previously described in the first disclosure of
the present specification.

In step S901, the terminal may determine whether the
terminal supports FR1 SL communication and/or FR2 SL
communication. If the terminal supports FR1 SL communi-
cation, the terminal may perform step S902. If the terminal supports FR2 SL communication, the terminal may perform step S913. If the terminal supports both FR1 SL communication and FR2 SL communication, The terminal may perform step S902 or step S913 based on the type of communication that the terminal currently wants to perform.

In step S902, the terminal may determine what the synchronization reference source is. For example, when the synchronization reference source is the SyncRef UE, the UE may perform steps S903 and S904. For example, when the synchronization reference source is GNSS, the UE may perform steps S905 and S906. For example, when the synchronization reference source is an E-UTRAN cell, the UE may perform steps S907 and S908. For example, when the synchronization reference source is the FR1 NR cell, the UE may perform steps S909 and S910. For example, when the synchronization reference source is the FR2 NR cell, the UE may perform steps S911 and S912.

In steps S903 and S904, the operation of the terminal described in Cases 1-4 may be performed. In step S903, the terminal may determine whether to transmit SLSS according to the description in Case 1-4. And, in step S904, the terminal may transmit SLSS or not transmit SLSS according to the decision of step S903. For example, step S903 may include the UE measuring the PSBCH-RSRP of the SyncRef UE within $T_{evaluate,SLSS}=4$ S-SSB periods. In addition, the UE may compare the measured PSBCH-RSRP with syncTxThreshOoC and determine to transmit SLSS when the PSBCH-RSRP is equal to or less than syncTxThreshOoC. The UE may not transmit SLSS when PSBCH-RSRP is greater than syncTxThreshOoC.

In steps S905 and S906, the operation of the terminal described in Case 1-3 may be performed. In step S905, the terminal may determine whether to transmit SLSS as described in Case 1-3. And, in step S906, the terminal may transmit SLSS or not transmit SLSS according to the decision in step S905. Step S905 may include a step of the UE determining what a serving cell is in a non-sidelink carrier. When the serving cell in the non-sidelink carrier is an E-UTRAN cell, the UE may perform operations according to steps S907 and S908. When the serving cell in the non-sidelink carrier is an FR1 NR cell, the UE may perform operations according to steps S909 and S910. When the serving cell in the non-sidelink carrier is an FR2 NR cell, the UE may perform operations according to steps S911 and S912.

In steps S907 and S908, the operation of the terminal described in Case 1-2 may be performed. In step S907, the terminal may determine whether to transmit SLSS based on the description in Case 1-2. And, in step S908, the terminal may transmit SLSS or not transmit SLSS according to the decision of step S907. For example, step S907 may include the UE measuring the RSRP of the E-UTRAN cell within $T_{evaluate,SLSS}$ (e.g., $T_{evaluate,SLSS}$ in the example of Table 9). In addition, the UE may compare the measured RSRP with syncTxThreshIC and determine to transmit SLSS when the RSRP is equal to or less than syncTxThreshIC. The UE may not transmit SLSS when RSRP is greater than syncTxThreshIC.

In step S909 and step S910, the operation of the terminal described in the case (Example: i-1-a) For FR1 NR cell as synchronization reference source) where the FR1 NR cell of Case 1-1 is a synchronization reference source may be performed. In step S909, the terminal may determine whether to transmit the SLSS as described in Case 1-1 (when the FR1 NR cell is a synchronization reference source). And, the terminal may transmit SLSS or not transmit SLSS according to the decision of step S909 in step S910. For example, step S909 may include the terminal measuring the RSRP of the FR1 NR cell within $T_{evaluate,SLSS}$ (e.g., $T_{evaluate,SLSS}$ in the example of Table 4 or Table 5). Here, when the terminal performs measurement using the measurement gap, $T_{evaluate,SLSS}$ may be $T_{evaluate,SLSS}$ in the example of Table 5. When the terminal performs measurement without a measurement gap, $T_{evaluate,SLSS}$ may be $T_{evaluate,SLSS}$ in the example of Table 4. In addition, the terminal may compare the measured RSRP with syncTxThreshIC and determine to transmit SLSS when the RSRP is equal to or less than syncTxThreshIC. The terminal may not transmit SLSS when RSRP is greater than syncTxThreshIC.

In steps S911 and S912, the operation of the terminal described in the case (e.g. i-1-b) For FR2 NR cell as synchronization reference source) where the FR2 NR cell of Case 1-1 is a synchronization reference source may be performed. In step S911, the terminal may determine whether to transmit the SLSS as described in Case 1-1 (when the FR2 NR cell is a synchronization reference source). And, in step S912, the terminal may transmit the SLSS or not transmit the SLSS according to the decision of step S911. Specifically, when performing steps S911 and S912, the operation described in "i-1-b) For FR2 NR cell as synchronization reference source" may be performed. For example, when proposal 1 is applied, the terminal can always transmit SLSS. For example, when proposal 2 is applied, the terminal can always transmit SLSS if the mobile speed of the terminal is high. For example, when proposal 3 is applied, when FR2 NR Cell is set as a synchronization reference source, if the movement speed of the terminal is small (or slow), the terminal may compare/evaluate the DL RSRP measurement value and a threshold (e.g., syncTxThreshIC) to start and/or stop transmission of SLSS. For example, when proposal 4 is applied, when FR2 NR Cell is set as a synchronization reference source, the terminal may compare/evaluate the DL RSRP measurement value and a threshold (e.g., syncTx-ThreshIC) to start and/or stop transmission of SLSS. When proposal 3 or proposal 4 is applied, when the terminal may perform measurement using the measurement gap, $T_{evaluate,SLSS}$ may be $T_{evaluate,SLSS}$ in the example of Table 8. When the UE performs measurement without a measurement gap, $T_{evaluate,SLSS}$ may be $T_{evaluate,SLSS}$ in the example of Table 7.

In step S913, the terminal may determine what the synchronization reference source is. For example, when the synchronization reference source is the SyncRef UE, the terminal may perform steps S914 and S915. For example, when the synchronization reference source is GNSS, the terminal may perform steps S916 and S917. For example, when the synchronization reference source is the E-UTRAN cell, the terminal may perform steps S918 and S919. For example, when the synchronization reference source is the FR1 NR cell, the terminal may perform steps S920 and S921. For example, when the synchronization reference source is the FR2 NR cell, the terminal may perform steps S922 and S923.

In steps S914 and S915, the operation of the terminal described in Case 2-4 may be performed. In step S914, the terminal may determine whether to transmit SLSS as described in Case 2-4. And, in step S915, the terminal may transmit SLSS or not transmit SLSS according to the decision in step S914. For example, step S914 may include determining whether the terminal uses beam management and measuring the PSBCH-RSRP of the SyncRef UE in $T_{evaluate,\ SLSS}$ by the terminal. Here, when the terminal uses beam management, $T_{evaluate,SLSS}$ may be an N*4 S-SSB period or a N/M*4*S-SSB period, as described in the example of Case 2-4. And, when the terminal does not use beam management, $T_{evaluate,SLSS}$ may be a 4*S-SSB period. The terminal may compare the measured PSBCH-RSRP with syncTxThreshOoC and determine to transmit the SLSS when the PSBCH-RSRP is equal to or less than syncTx-ThreshOoC. The terminal may not transmit SLSS when PSBCH-RSRP is greater than syncTxThreshOoC.

In steps S916 and S917, the operation of the terminal described in Case 2-3 may be performed. Steps S916 and S917 may be performed in the same manner as steps S905 and S906 described above.

In steps S918 and S919, the operation of the terminal described in Case 2-2 may be performed. Steps S918 and S919 may be performed in the same manner as steps S907 and S908 described above.

In steps S920 and S921, the operation of the terminal described in the case where the FR1 NR cell of Case 2-1 is a synchronization reference source may be performed. Steps S920 and S921 may be performed in the same manner as steps S909 and S910 described above.

In steps S922 and S923, the operation of the terminal described in the case where the FR2 NR cell of Case 2-1 is a synchronization reference source may be performed. Steps S922 and S923 may be performed in the same manner as steps S911 and S912 described above.

For reference, the terminal may perform SL DRX. When the terminal performs SL DRX, the UE may perform operations according to the examples of FIGS. 11a and 11b to be described below.

2. Second Disclosure of the Present Specification

The second disclosure of the present specification refers to various examples propose an operation of a UE related to initiation and ceasing of NR sidelink synchronization signal (SLSS) transmission when the terminal performs SL Discontinuous Reception (DRX) for NR SL communication. The contents described in the second disclosure of the present specification may be applied to sidelink communication. For example, the content described in the second disclosure of the present specification may be applied to Sidelink services, NR V2X, Public Safety, Device to Device (D2D), commercial use cases, and the like.

The second disclosure of the present specification proposes an example of an operation for starting and an example of an operation for stopping its own SLSS transmission to a neighboring terminal when an NR Sidelink (SL) supporting terminal performs SL DRX (Discontinuous Reception). Here, the NR SL supporting terminal may mean a wireless communication device supporting NR SL communication.

A case in which a terminal starts SLSS transmission, may be a case in which a terminal is to synchronize time with a neighboring terminal, when the terminal is in an environment where time synchronization with neighboring terminals is out of sync. In other words, in an environment where time synchronization with neighboring terminals is out of sync, in order to match time synchronization with neighboring terminals, the terminal may transmit SLSS to the neighboring terminals. For example, device A may start SLSS transmission. Then, by detecting the SLSS of device A, device B nay match (synchronize) time synchronization with each other (e.g., time synchronization of device A and device B). And, device A and device B can perform SL communication.

Conversely, a case in which a terminal stops SLSS transmission may be a case in which a neighboring terminal uses the same synchronization timing source as itself. For example, when device A and device B use the same gNB as a synchronization timing source, device A may not need to transmit SLSS to synchronize time with device B. This is because the time synchronization of device A and device B already coincides because the same gNB is a synchronization timing source.

As such, SLSS transmission may not always be performed. For example, SLSS transmission may be started or stopped depending on the environment. To this end, UE operations for starting SLSS transmission and stopping SLSS transmission must be clearly defined.

The second disclosure of the present specification describes various examples of terminal operations for starting SLSS transmission and stopping SLSS transmission when the terminal performs SL DRX.

For reference, the terminal may perform DRX in communication with the base station. Also, the terminal may perform DRX even in NR SL communication. For example, the terminal may perform NR SL communication by performing SL DRX.

For reference, the terminal (or UE) described in the second disclosure of the present specification may mean a terminal (or UE) performing SL DRX.

i) Case 3

When a terminal supporting FR1 SL communication performs SL DRX, the following description may be applied. For example, when a terminal supporting FR1 SL communication performs SL DRX, based on the Rel-16 NR V2X terminal operation (3GPP TS38.133 V16.3.0) where SL DRX was not considered, the terminal may perform operations based on the following example.

Initiation/Cease of SLSS Transmissions will be described.

In the case of the following example, the description of initiation/cease of SLSS transmission may be applied to NR V2X sidelink communication, public safety, D2D (device to device), commercially available UE:

when GNSS is used as a synchronization reference source;

when an NR cell is used as a synchronization reference source;

when an EUTRAN cell is used as a synchronization reference source;

when a SyncRef UE is used as a synchronization reference source.

i-1) Case 3-1

In Case 3-1, the initiation/cease of SLSS transmission when a UE supporting FR1 SL communication performs SL DRX and the NR cell is a synchronization reference source will be described. Here, the NR cells may include FR1 NR cells and FR2 NR cells.

The requirements described below may be applied when the NR cell is used as a synchronization reference source and the UE satisfies the following conditions:

when the UE is out of coverage on the NR sidelink carrier and the UE is in-coverage with a serving cell on a NR non-sidelink carrier;

A condition for SLSS transmission (e.g., a condition for SLSS transmission in 3GPP TS 38.331 V16.1.0) is satisfied;

networkControlledSyncTx is not set; and syncTxThreshIC is included in a System Information Block (SIB) (e.g., SystemInformationBlockType12).

To initiation/cease SLSS transmission, the UE may measure the RSRP of the cell used as a synchronization reference source within $T_{evaluate,SLSS}$ and evaluate the RSRP. Here, $T_{evaluate,SLSS}$ may mean, for example, an evaluation interval for performing measurement related to SLSS.

For example, when a terminal supporting FR1 SL communication performs SL DRX and the FR1 NR cell is a synchronization reference source, $T_{evaluate,SLSS}$ may be the same as the example of Table 10 or Table 11.

For example, when a UE supporting FR1 SL communication performs SL DRX and the FR2 NR cell is a synchronization reference source, $T_{evaluate,SLSS}$ may be the same as the example of Table 12 or Table 13.

Hereinafter, a UE is a UE that supports FR1 SL communication and performs SL DRX.

For example, for a synchronization reference source, FR1 NR cell, when the UE performs SSB-based measurement without a measurement gap, $T_{evaluate,SLSS}$ may be the same as the example of Table 10.

For example, for a synchronization reference source, FR1 NR cell, when the UE performs SSB-based measurement using a measurement gap, $T_{evaluate,SLSS}$ may be the same as the example of Table 11.

For example, for a synchronization reference source, FR2 NR cell, when the UE performs SSB-based measurement without a measurement gap, $T_{evaluate,SLSS}$ may be the same as the example of Table 12.

For example, for a synchronization reference source, FR2 NR cell, when the UE performs SSB-based measurement using a measurement gap, $T_{evaluate,SLSS}$ may be the same as the example of Table 13.

TABLE 10

| DRX cycle in NR cell | $T_{evaluate,\ SLSS}$ |
|---|---|
| No DRX | max(400 ms, ceil(2 × 5 × $K_p$) × SMTC period) (Note 1 is applied) |
| DRX cycle ≤ 320 ms | max(400 ms, ceil(1.5 × 2 × 5 × $K_p$) × max (SMTC period, DRX cycle)) |
| DRX cycle > 320 ms | ceil(7 × $K_p$) × DRX cycle |

The example of Table 10 shows an example of $T_{evaluate,SLSS}$ for measurement without measurement gap when the NR cell is used as a synchronization reference source in FR1.

For reference, Kp may have the same meaning as Kp described in the example of Table 4.

In the example of Table 10, NOTE 1 may mean the following. When different SMTC periods are set for different cells, in the example of Table 10, the SMTC cycle may mean the SMTC cycle used in the identified cell.

TABLE 11

| DRX cycle in NR cell | $T_{evaluate,\ SLSS}$ |
|---|---|
| No DRX | max(400 ms, 2 × 5 × max(MGRP, SMTC period)) × $CSSF_{intra}$ |
| DRX cycle ≤ 320 ms | max(400 ms, ceil(2 × 1.5 × 5) × max(MGRP, SMTC period, DRX cycle)) × $CSSF_{intra}$ |
| DRX cycle > 320 ms | 7 × max(MGRP, DRX cycle) × $CSSF_{intra}$ |

The example in Table 11 shows an example of $T_{evaluate,SLSS}$ for measurement with measurement gaps when the NR cell is used as the synchronization reference source in FR1.

TABLE 12

| DRX cycle | $T_{evaluate,\ SLSS}$ |
|---|---|
| No DRX | max(A × 400 ms, ceil(B × $M_{meas\_period\_w/o\_gaps}$ × $K_p$ × $K_{layer1\_measurement}$) × SMTC period) × $CSSF_{intra}$ (Note 1 is applied) |

TABLE 12-continued

| DRX cycle | $T_{evaluate,\ SLSS}$ |
|---|---|
| DRX cycle ≤ 320 ms | max(A × 400 ms, ceil(C × 1.5 × $M_{meas\_period\_w/o\_gaps}$ × $K_p$ × $K_{layer1\_measurement}$) × max(SMTC period, DRX cycle)) × $CSSF_{intra}$ |
| DRX cycle > 320 ms | ceil(D × $M_{meas\_period\_w/o\_gaps}$ × $K_p$ × $K_{layer1\_measurement}$) × DRX cycle × $CSSF_{intra}$ |

The example in Table 12 shows an example of $T_{evaluate,SLSS}$ for measurement without measurement gap when the FR2 NR cell is used as a synchronization reference source.

In the example of Table 12, NOTE 1 may mean the following. When different SMTC cycles are set for different cells, in the example of Table 12, the SMTC periods may mean the SMTC periods used in the identified cell.

TABLE 13

| DRX cycle | $T_{evaluate,\ SLSS}$ |
|---|---|
| No DRX | max(A × 400 ms, B × $M_{meas\_period\ with\_gaps}$ × max(MGRP, SMTC period)) × $CSSF_{intra}$ |
| DRX cycle ≤ 320 ms | max(A × 400 ms, ceil(C × 1.5 × $M_{meas\_period\ with\_gaps}$) × max(MGRP, SMTC period, DRX cycle)) × $CSSF_{intra}$ |
| DRX cycle > 320 ms | D × $M_{meas\_period\ with\_gaps}$ × max(MGRP, DRX cycle) × $CSSF_{intra}$ |

The example in Table 13 shows an example of $T_{evaluate,SLSS}$ for measurement with measurement gaps when a FR2 NR cell is used as a synchronization reference source.

In the examples of Table 12 and Table 13, considering the small cell size of the FR2 cell and the movement speed of the UE, A, B, C, and D are proposed as the following examples so that $T_{evaluate,SLSS}$ is not too large. For reference, compared to the FR1 NR cell, the size of the FR2 NR Cell (e.g., the communication radius of the FR2 NR cell) is considered very small (e.g., the cell radius is 150 m):

When proposal 3 described in the first disclosure of the present specification is equally applied, {A, B, C, D}={1, 2, 2, 1.5} or {1, 2, 2, 2} or {2, 2, 2, 1.5} or {2, 2, 2, 2};

When Proposal 4 described in the first disclosure of the present specification is equally applied, {A, B, C, D}={1, 1.5, 1.5, 1.5} or {2, 1.5, 1.5, 1.5} or {1, 2, 2, 1.5} or {1, 2, 2, 2} or {2, 2, 2, 1.5} or {2, 2, 2, 2}.

The various parameters included in the examples of Table 12 and the examples of Table 13 can be defined as in the following examples:

$T_{evaluate,SLSS}$ when the UE performs SSB-based measurement without a measurement gap is shown in the example of Table 12.

$T_{evaluate,\ SLSS}$ when the UE performs SSB-based measurement using the measurement gap is the same as the example of Table 13.

$M_{meas\_period\_w/o\_gaps}$: For UEs supporting power class 1, $M_{meas\_period\_w/o\_gaps}$=40. For UEs supporting FR2 power class 2, $M_{meas\_period\_w/o\_gaps}$=24. For UEs supporting power class 3, $M_{meas\_period\_w/o\_gaps}$=24. For UEs supporting power class 4, $M_{meas\_period\_w/o\_gaps}$=24. For UEs supporting FR2 SL, $M_{meas\_period\_w/o\_gaps}$ value for UEs supporting FR2 Power Class 2 ($M_{meas\_period\_w/o\_gaps}$=24) may be applied.

$M_{meas\_period\_with\_gaps}$: For UEs supporting power class 1, $M_{meas\_period\_with\_gaps}$=40. For UEs supporting power class 2, $M_{meas\_period\_with\_gaps}$=24. For UEs supporting power class 3, $M_{meas\_period\_with\_gaps}$=24. For UEs supporting power class 4, $M_{meas\_period\_with\_gaps}$=24. For a UE supporting FR2 SL, an $M_{meas\_period\_with\_gaps}$ value ($M_{meas\_period\_with\_gaps}$=24) for a UE supporting FR2 power class 2 may be applied.

Kp=1: When the intra-frequency SMTC does not completely overlap the measurement gap or the intra-frequency SMTC completely overlaps the MG.

Kp=1/(1−(SMTC period/MGRP)): If SMTC period<MGRP, and intra-frequency SMTC partially overlaps the measurement gap.

$K_{layer1\_measurement}$=1: $K_{layer1\_measurement}$=1 in the following cases:

When all reference signals, for beam reporting on any FR2 serving frequency in the same band outside the measurement gap, configured for RLM, BFD, CBD or L1-RSRP do not completely overlap by intra-frequency SMTC occasion, or when all reference signals configured for RLM, BFD, CBD or L1-RSRP for beam reporting on any FR2 serving frequency in the same band outside the measurement gap are completely overlapped by intra-frequency SMTC occasion, and all reference signal configured for RLM, BFD, CBD or L1-RSRP for beam reporting on any FR2 serving frequency in the same band outside the measurement gap do not overlap with any of SSB symbols and RSSI symbols, 1 symbol before consecutive SSB symbols and RSSI symbols, and 1 symbol after consecutive SSB symbols and RSSI symbols (Here, when SSB-ToMeasure and SS-RSSI-Measurement are set, the SSB symbol is indicated by SSB-ToMeasure and the RSSI symbol is indicated by SS-RSSI-Measurement).

In other cases, $K_{layer1\_measurement}$=1.5.

$CSSF_{intra}$: This is a carrier specific scaling factor. $CSSF_{intra}$ can be determined according to the following example:

$CSSF_{intra}$ may be determined based on $CSSF_{outside\_gap,i}$ of clause 9.1.5.1 in 3GPP TS38.133 V16.3.0 for measurements performed outside the measurement gap. For example, when the intra-frequency SMTC does not overlap at all or has some overlap with the measurement gap. or $CSSF_{intra}$ may be determined according to $CSSF_{within\_gap,i}$ of clause 9.1.5.1 in 3GPP TS38.133 V16.3.0 for measurements performed inside the measurement gap. For example, when the intra-frequency SMTC completely overlaps the measurement gap.

The period of Intra-frequency SMTC occasions (e.g., SMTC period) may be as in the following example:

When higher layer signaling smtc2 of 3GPP TS 38.331 V16.1.0 is set, the period of Intra-frequency SMTC occasions may correspond to the value of higher layer parameter smtc2;

In other cases, the period of Intra-frequency SMTC occasions may correspond to the value of the higher layer parameter smtc1.

If higher layer filtering is configured, an additional delay in evaluation to initiate/cease SLSS transmissions can be expected i-2) Case 3-2

In Case 3-2, initiation/cease of SLSS transmission when a UE supporting FR1 SL communication performs SL DRX and an EUTRAN cell is a synchronization reference source will be described.

The requirements described below may be applied when an EUTRAN cell is used as a synchronization reference source and the UE satisfies the following conditions:

when the UE is out of coverage on the NR sidelink carrier and in coverage with the serving cell on the LTE non-sidelink carrier;

A condition for SLSS transmission (e.g., a condition for SLSS transmission in 3GPP TS 38.331 V16.1.0) is satisfied;

networkControlledSyncTx is not set; and syncTxThreshIC is included in a System Information Block (SIB) (e.g., SystemInformationBlockType28).

To initiation/cease SLSS transmission, the UE can measure and evaluate the RSRP of the cell used as the vaporization reference source within $T_{evaluate,SLSS}$.

Here, $T_{evaluate,SLSS}$ may be as in the following example:

If DRX is not configured for the UE, $T_{evaluate,SLSS}$=0.4 seconds.

When DRX is configured for the UE, $T_{evaluate,SLSS}$ may be the same as the example of Table 14.

TABLE 14

| DRX cycle length in EUTRAN cell[s] | $T_{evaluate,\ SLSS}$ [s] (number of DRX cycles) |
|---|---|
| ≤0.04 | 0.4 (Note 1) |
| 0.04 < DRX-cycle ≤ 0.56 | Note 2 (6) |

The example of Table 14 shows an example of $T_{evaluate,SLSS}$ when an EUTRAN cell is used as a synchronization reference source.

In the example of Table 14, Note 1 means that the number of DRX cycles may vary depending on the DRX cycle in use. NOTE 2 means that the time may vary depending on the DRX cycle in use.

If higher layer filtering is configured, additional delay may be expected in evaluating initiation/cease of SLSS transmission.

i-3) Case 3-3

In Case 3-3, when a UE supporting FR1 SL communication performs SL DRX and GNSS is a synchronization reference source, initiation/cease of SLSS transmission will be described.

The requirements described below may be applied when GNSS is used as a synchronization reference source and the UE satisfies the following conditions:

When the UE is out of coverage on the NR sidelink carrier and in coverage with a serving cell on a non-sidelink carrier;

A condition for SLSS transmission (e.g., a condition for SLSS transmission in 3GPP TS 38.331 V16.1.0) is satisfied;

networkControlledSyncTx is not set; and syncTxThreshIC is included in a System Information Block (SIB) (e.g., SystemInformationBlockType12).

Alternatively, the requirements described below may be applied when GNSS is used as a synchronization reference source and the UE satisfies the following conditions:

when the UE is out of coverage on the NR sidelink carrier and in coverage with the serving cell on the LTE non-sidelink carrier;

A condition for SLSS transmission (e.g., a condition for SLSS transmission in 3GPP TS 38.331 V16.1.0) is satisfied;

networkControlledSyncTx is not set; and syncTxThreshIC is included in a System Information Block (SIB) (e.g., SystemInformationBlockType28).

When the serving cell is an NR cell, the contents (eg requirements) described in Case 3-1 above may be applied.

If the serving cell is an EUTRAN cell, the contents (eg requirements) described in Case 3-2 above may be applied.

If higher layer filtering is configured, additional delay may be expected in evaluating initiation/cease of SLSS transmission.

i-4) Case 3-4

In Case 3-4, the initiation/cease of SLSS transmission when a UE supporting FR1 SL communication performs SL DRX and the SyncRef UE is a synchronization reference source is described.

The requirements described below may be applied when a SyncRef UE is used as a synchronization reference source and the UE satisfies the following conditions:

when the UE is in any cell selection state, or when the UE is out of coverage on the NR sidelink carrier and associated with a serving cell on the NR non-sidelink carrier;

A condition for SLSS transmission (e.g., a condition for SLSS transmission in 3GPP TS 38.331 V16.1.0) is satisfied;

SyncRef UE is used as a synchronization reference source; and

When syncTxThreshOoC is included within the preset NR SL parameters.

To initiation/cease SLSS transmission, the UE may measure the PSBCH-RSRP of the SyncRef UE selected as the synchronization reference source within $T_{evaluate,SLSS}$ as in the example of Table 15, and evaluate the PSBCH-RSRP.

TABLE 15

| SL DRX cycle length in NR SL [s] | $T_{evaluate,\ SLSS}$ [s] |
|---|---|
| 0. ≤ .16 | 4 × max(S-SSB periodicity, SL DRX cycle) |
| 0.16 < SL DRX-cycle | 4 × SL DRX cycle |

Table 15 shows an example of $T_{evaluate,SLSS}$ when the SyncRef UE is used as a synchronization reference source.

For the example of Table 15, SL DRX On duration may be applied. For example, in order to measure the RSRP of the SyncRef UE, the UE can measure the RSRP of the SyncRef UE in the 'On' interval of the SL DRX interval of the UE. To this end, the SLSS of the SyncRef UE may be located in the SL DRX 'On duration' of the UE. The terminal wakes up briefly in the terminal's SL DRX 'on duration' section, receives a signal such as SLSS, and switches to 'off duration' to perform power saving without performing an operation to receive the signal.

If higher layer filtering is configured, additional delay may be expected in evaluating initiation/cease of SLSS transmission.

Here, the SL DRX On duration of the UE is proposed to be set such that PSBCH-RSRP measurement is guaranteed in the SL DRX On duration. Referring to the example of FIG. 10, an example in which the SL DRX On duration of the UE is set so that PSBCH-RSRP measurement is guaranteed in the SL DRX On duration will be described.

The following drawings are made to explain a specific example of the present specification. Since the names of specific devices or names of specific signals/messages/fields described in the drawings are provided as examples, the technical features of the present specification are not limited to the specific names used in the drawings below.

FIG. 10 shows an example of SL DRX On duration and S-SSB according to an embodiment of the second disclosure of the present specification.

Referring to the example of FIG. 10, the S-SSB may be received at a period of 160 ms. FIG. 10 shows examples when the SL DRX Cycle is 80 ms, 160 ms, or 320 ms. For example, when the SL DRX Cycle is 80 ms, the DRX ON duration is repeated with a cycle of 80 ms.

In the example of FIG. 10, A represents an example of S-SSB reception in SL DRX On duration. A of the example of FIG. 10 shows various examples according to SL DRX cycle=80 ms, 160 ms, and 320 ms.

In the example of FIG. 10, B shows an example in which S-SSB reception is not performed in SL DRX On duration. B of the example of FIG. 10 shows various examples according to SL DRX cycle=80 ms, 160 ms, and 320 ms.

As shown in A of the example of FIG. 10, it is proposed to set the SL DRX On duration so that the S-SSB can be received in the SL DRX On duration.

In other words, when a UE supporting FR1 SL communication performs SL DRX and the SyncRef UE is a synchronization reference source, to initiation/cease SLSS transmission, the UE may measure and evaluate the PSBCH-RSRP of the SyncRef UE selected as a synchronization reference source within $T_{evaluate,SLSS}$ as shown in the example of Table 15. And, the SL DRX On duration may be set so that the S-SSB can be received in the SL DRX On duration of the UE.

ii) Case 4

When a terminal supporting FR2 SL communication performs SL DRX, an operation such as the example below may be performed.

Initiation/Cease of SLSS Transmissions will be described.

In the case of the following example, the description of initiation/cease of SLSS transmission may be applied to NR V2X sidelink communication, public safety, D2D (device to device), commercially available UE:

when GNSS is used as a synchronization reference source;

when an NR cell is used as a synchronization reference source;

when an EUTRAN cell is used as a synchronization reference source;

when a SyncRef UE is used as a synchronization reference source.

ii-1) Case 4-1

In Case 4-1, the initiation/cease of SLSS transmission when a terminal supporting FR2 SL communication performs SL DRX and the NR cell is a synchronization reference source will be described. Here, the NR cells may include FR1 NR cells and FR2 NR cells.

The requirements described below may be applied when the NR cell is used as a synchronization reference source and the UE satisfies the following conditions:

when the UE is out of coverage on the NR sidelink carrier and the UE is in-coverage with a serving cell on a NR non-sidelink carrier;

A condition for SLSS transmission (e.g., a condition for SLSS transmission in 3GPP TS 38.331 V16.1.0) is satisfied;

networkControlledSyncTx is not set; and syncTxThreshIC is included in a System Information Block (SIB) (e.g., SystemInformationBlockType12).

To initiation/cease SLSS transmission, the UE may measure the RSRP of the cell used as a synchronization reference source within $T_{evaluate,SLSS}$ and evaluate the RSRP. Here, $T_{evaluate,SLSS}$ may mean, for example, an evaluation interval for performing measurement related to SLSS.

For example, when a terminal supporting FR2 SL communication performs SL DRX and the FR2 NR cell is a synchronization reference source, $T_{evaluate,SLSS}$ may be the same as the example of Table 10 or Table 11.

For example, when a UE supporting FR2 SL communication performs SL DRX and the FR2 NR cell is a synchronization reference source, $T_{evaluate,SLSS}$ may be the same as the example of Table 12 or Table 13.

Hereinafter, a UE is a UE that supports FR2 SL communication and performs SL DRX.

For example, for a synchronization reference source, FR1 NR cell, when the UE performs SSB-based measurement without a measurement gap, $T_{evaluate,SLSS}$ may be the same as the example of Table 10.

For example, for a synchronization reference source, FR1 NR cell, when the UE performs SSB-based measurement using a measurement gap, $T_{evaluate,SLSS}$ may be the same as the example of Table 11.

For example, for a synchronization reference source, FR2 NR cell, when the UE performs SSB-based measurement without a measurement gap, $T_{evaluate,SLSS}$ may be the same as the example of Table 12.

For example, for a synchronization reference source, FR2 NR cell, when the UE performs SSB-based measurement using a measurement gap, $T_{evaluate,SLSS}$ may be the same as the example of Table 13.

If higher layer filtering is configured, additional delay may be expected in evaluating initiation/cease of SLSS transmission.

ii-2) Case 4-2

In Case 4-2, the initiation/cease of SLSS transmission when a terminal supporting FR2 SL communication performs SL DRX and an EUTRAN cell is a synchronization reference source will be described.

The requirements described below may be applied when an EUTRAN cell is used as a synchronization reference source and the UE satisfies the following conditions:

when the UE is out of coverage on the NR sidelink carrier and in coverage with the serving cell on the LTE non-sidelink carrier;

A condition for SLSS transmission (e.g., a condition for SLSS transmission in 3GPP TS 38.331 V16.1.0) is satisfied;

networkControlledSyncTx is not set; and

When syncTxThreshIC is included in a System Information Block (SIB) (e.g., such as SystemInformationBlockType28).

To initiation/cease SLSS transmission, the UE can measure and evaluate the RSRP of the cell used as the vaporization reference source within $T_{evaluate,SLSS}$.

Here, $T_{evaluate,SLSS}$ may be as in the following example:

If DRX is not configured for the UE, $T_{evaluate,SLSS}$=0.4 seconds.

When DRX is configured for the UE, $T_{evaluate,SLSS}$ may be the same as the example of Table 14.

If higher layer filtering is configured, additional delay may be expected in evaluating initiation/cease of SLSS transmission.

ii-3) Case 4-3

In Case 4-3, when a UE supporting FR2 SL communication performs SL DRX and GNSS is a synchronization reference source, initiation/cease of SLSS transmission will be described.

The requirements described below may be applied when GNSS is used as a synchronization reference source and the UE satisfies the following conditions:

When the UE is out of coverage on the NR sidelink carrier and in coverage with a serving cell on a non-sidelink carrier;

A condition for SLSS transmission (e.g., a condition for SLSS transmission in 3GPP TS 38.331 V16.1.0) is satisfied;

networkControlledSyncTx is not set; and syncTxThreshIC is included in a System Information Block (SIB) (e.g., SystemInformationBlockType12).

Alternatively, the requirements described below may be applied when GNSS is used as a synchronization reference source and the UE satisfies the following conditions:

when the UE is out of coverage on the NR sidelink carrier and in coverage with the serving cell on the LTE non-sidelink carrier;

A condition for SLSS transmission (e.g., a condition for SLSS transmission in 3GPP TS 38.331 V16.1.0) is satisfied;

networkControlledSyncTx is not set; and syncTxThreshIC is included in a System Information Block (SIB) (e.g., SystemInformationBlockType28).

When the serving cell is an NR cell, the contents (eg requirements) described in Case 4-1 above may be applied.

If the serving cell is an EUTRAN cell, the contents (eg requirements) described in Case 4-2 above may be applied.

If higher layer filtering is configured, additional delay may be expected in evaluating initiation/cease of SLSS transmission.

4-4) Case 4-4

In Case 4-4, the initiation/cease of SLSS transmission when a terminal supporting FR2 SL communication performs SL DRX and the SyncRef UE is a synchronization reference source is described.

The requirements described below may be applied when a SyncRef UE is used as a synchronization reference source and the UE satisfies the following conditions:

when the UE is in any cell selection state, or when the UE is out of coverage on the NR sidelink carrier and associated with a serving cell on the NR non-sidelink carrier;

A condition for SLSS transmission (e.g., a condition for SLSS transmission in 3GPP TS 38.331 V16.1.0) is satisfied;

SyncRef UE is used as a synchronization reference source; and

When syncTxThreshOoC is included within the preset NR SL parameters.

To initiation/cease SLSS transmission, the UE may measure the PSBCH-RSRP of the SyncRef UE selected as the synchronization reference source within $T_{evaluate,SLSS}$ as in the example of Table 16, and evaluate the PSBCH-RSRP.

TABLE 16

| SL DRX cycle length in NR SL [s] | $T_{evaluate, SLSS}$ [s] |
|---|---|
| ≤0.16 | M × max(S-SSB periodicity, SL DRX cycle) |
| 0.16 < SL DRX-cycle | M × SL DRX cycle |

Table 16 shows an example of $T_{evaluate,SLSS}$ when the SyncRef UE is used as a synchronization reference source.

For FR2 SL supported terminals, for SL RSRP (PSBCH-RSRP) evaluation time for initiation and cease of SLSS transmission, a beam may be considered. This is because beam management according to beamforming can be used for FR2 SL communication.

Assuming that the FR2 SL terminal applies SL beam management and operates N beams, in the example of Table 16, M=N×4 may be defined. Here, 4 may correspond to 4*S-SSB periodicity, which is the evaluation time of the FR1 SL terminal. Considering that 4 to 8 beams of the FR2 SL terminal can be operated, M=16 to 32 are proposed. As an example, M=24 is suggested.

Considering the movement speed of the UE, a $T_{evaluate,SLSS}$ time N times greater than $T_{evaluate,SLSS}$ in FR1 may not be desirable. In order to reduce the time of "Tevaluate,SLSS", in the case of the FR2 SL terminal, it is proposed that K (K≥2 integer) or more SLSSs are basically set (or allocated) in the S-SSB. For example, a SycnRef UE supporting FR2 SL may transmit K or more SLSSs in one S-SSB. In this case, in the example of Table 16, it can be defined as M=(N/K)×4 S-SSB cycles.

An example of evaluation time ($T_{evaluate, SLSS}$) can be:
Assuming N=4 to 8 and K=2, M=8 to 16 in the example of Table 16. As an example, we propose M=12.
Assuming N=4-8 and K=4, $T_{evaluate,SLSS}$=4 S-SSB periods~8 S-SSB periods. As an example, $T_{evaluate, SLSS}$=6 S-SSB cycles (960 ms) are proposed.

If higher layer filtering is configured, additional delay may be expected in evaluating initiation/cease of SLSS transmission.

Here, the SL DRX On duration of the UE is proposed to be set such that PSBCH-RSRP measurement is guaranteed in the SL DRX On duration. Referring to the example of FIG. 10, an example in which the SL DRX On duration is set so that PSBCH-RSRP measurement is guaranteed in the SL DRX On duration will be described.

In the example of FIG. 10, A represents an example of S-SSB reception in SL DRX On duration. A of the example of FIG. 10 shows various examples according to SL DRX cycle=80 ms, 160 ms, and 320 ms. In the example of FIG. 10, B shows an example in which S-SSB reception is not performed in SL DRX On duration. B of the example of FIG. 10 shows various examples according to SL DRX cycle=80 ms, 160 ms, and 320 ms. As shown in A of the example of FIG. 10, it is proposed to set the SL DRX On duration so that the S-SSB can be received in the SL DRX On duration.

In other words, when a UE supporting FR1 SL communication performs SL DRX and the SyncRef UE is a synchronization reference source, to initiation/cease SLSS transmission, the UE may measure and evaluate the PSBCH-RSRP of the SyncRef UE selected as a synchronization reference source within $T_{evaluate,SLSS}$ as shown in the example of Table 15. And, the SL DRX On duration may be set so that the S-SSB can be received in the SL DRX On duration of the UE.

The following drawings are made to explain a specific example of the present specification. Since the names of specific devices or names of specific signals/messages/fields described in the drawings are provided as examples, the technical features of the present specification are not limited to the specific names used in the drawings below.

Figure 11A:
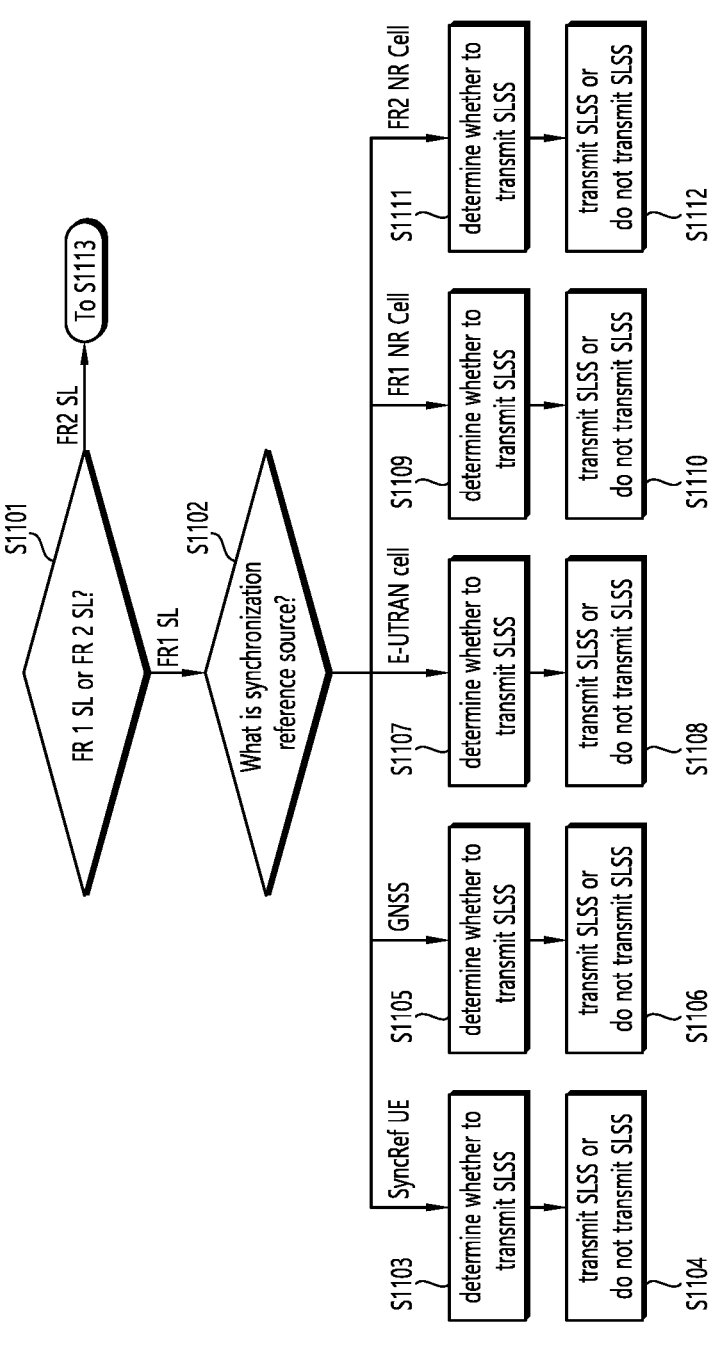
FIGS. 11*a* and 11*b* illustrate an example of an operation of a terminal according to an embodiment of the second disclosure of the present specification.
Figure 11B:
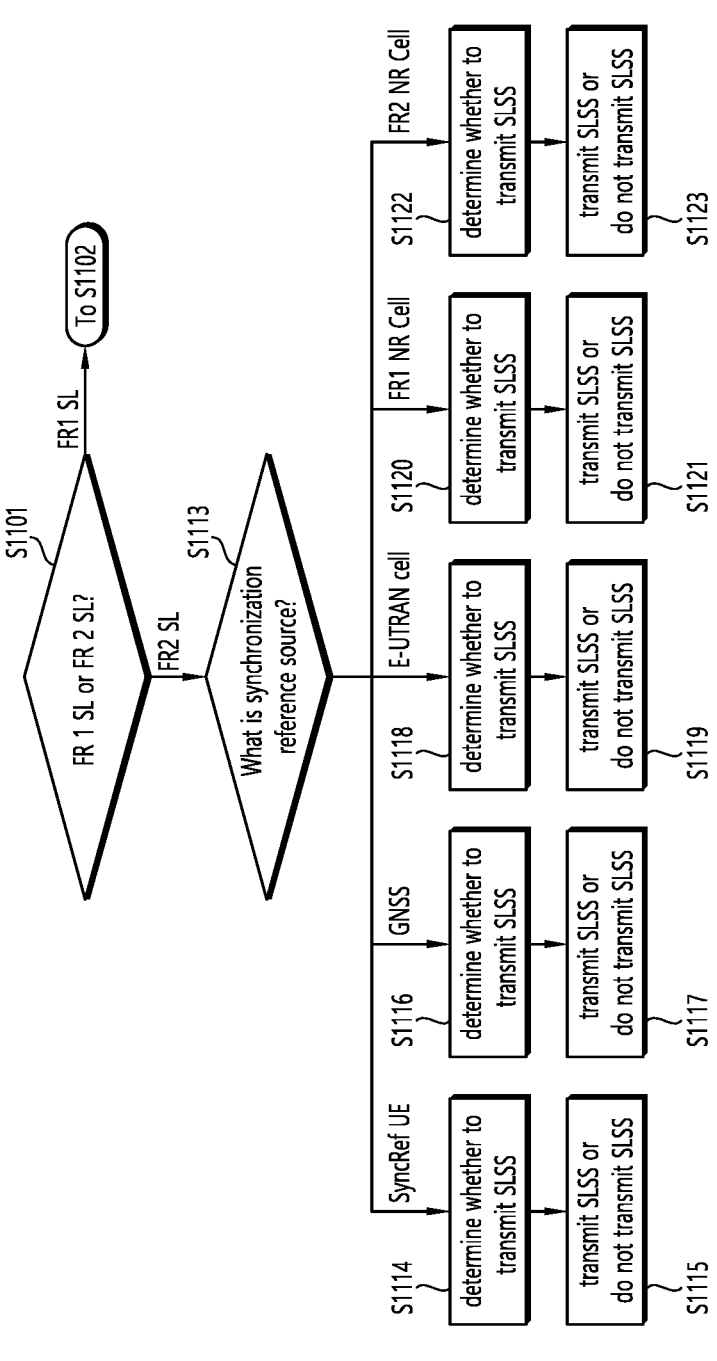

FIGS. 11a and 11b illustrate an example of an operation of a terminal according to an embodiment of the second disclosure of the present specification.

The terminal may perform SL DRX. When the UE performs SL DRX, the terminal may perform operations according to the examples of FIGS. 11a and 11b to be described below. When the terminal does not perform SL DRX, the UE may perform operations according to the examples of FIGS. 9a and 9b described above.

FIGS. 11a and 11b show an example of an operation of a terminal according to the second disclosure of the present specification. The contents shown in FIGS. 11a and 11b are merely examples, and the scope of the disclosure of the present specification is not limited by FIGS. 11a and 11b.

The terminal may perform operations according to various examples previously described in the second disclosure of the present specification.

In step S1101, the terminal may determine whether the terminal supports FR1 SL communication and/or FR2 SL communication. If the terminal supports FR1 SL communication, the terminal may perform step S1102. If the terminal supports FR2 SL communication, the terminal may perform step S1113. If the terminal supports both FR1 SL communication and FR2 SL communication, The terminal may perform step S1102 or step S1113 based on the type of communication that the terminal currently wants to perform.

In step S1102, the terminal may determine what the synchronization reference source is. For example, when the synchronization reference source is the SyncRef UE, the UE may perform steps S1103 and S1104. For example, when the synchronization reference source is GNSS, the UE may perform steps S1105 and S1106. For example, when the synchronization reference source is an E-UTRAN cell, the UE may perform steps S1107 and S1108. For example, when the synchronization reference source is the FR1 NR cell, the UE may perform steps S1109 and S1110. For example, when the synchronization reference source is the FR2 NR cell, the UE may perform steps S1111 and S1112.

In steps S1103 and S1104, the operation of the terminal described in Case 3-4 may be performed. In step S1103, the terminal may determine whether to transmit SLSS according to the description in Case 3-4. And, the terminal may transmit SLSS or not transmit SLSS according to the decision of step S1103 in step S1104. For example, step S1103 may include the UE measuring the PSBCH-RSRP of the SyncRef UE within $T_{evaluate,SLSS}$ (e.g., $T_{evaluate,SLSS}$ in the example of Table 15). In addition, the UE may compare the measured PSBCH-RSRP with syncTxThreshOoC and determine to transmit SLSS when the PSBCH-RSRP is equal to or less than syncTxThreshOoC. The UE may not transmit SLSS when PSBCH-RSRP is greater than syncTxThreshOoC.

In steps S1105 and S1106, the operation of the terminal described in Case 3-3 may be performed. In step S1105, the terminal may determine whether to transmit SLSS as described in Case 3-3. And, in step S1106, the terminal may transmit SLSS or not transmit SLSS according to the decision in step S1105. Step S1105 may include a step of the UE determining what a serving cell is in a non-sidelink carrier. When the serving cell in the non-sidelink carrier is an E-UTRAN cell, the UE may perform operations according to steps S1107 and S1108. When the serving cell in the non-sidelink carrier is an FR1 NR cell, the UE may perform operations according to steps S1109 and S1110. When the serving cell in the non-sidelink carrier is an FR2 NR cell, the UE may perform operations according to steps S1111 and S1112.

In steps S1107 and S1108, the operation of the terminal described in Case 3-2 may be performed. In step S1107, the terminal may determine whether to transmit SLSS based on the description in Case 3-2. And, the terminal may transmit SLSS or not transmit SLSS according to the decision of step S1107 in step S1108. For example, step S1107 may include the UE measuring the RSRP of the E-UTRAN cell within $T_{evaluate,SLSS}$ (e.g., $T_{evaluate,SLSS}$ in the example of Table 14). In addition, the UE may compare the measured RSRP with syncTxThreshIC and determine to transmit the SLSS when the RSRP is equal to or less than syncTxThreshIC. The UE may not transmit SLSS when RSRP is greater than syncTx-ThreshIC.

In step S1109 and step S1110, the operation of the terminal described in the case (Example: i-1-a) For FR1 NR cell as synchronization reference source) where the FR1 NR cell of Case 3-1 is a synchronization reference source may be performed. In step S1109, the terminal may determine whether to transmit the SLSS as described in Case 3-1 (when the FR1 NR cell is a synchronization reference source). And, the terminal may transmit SLSS or not transmit SLSS according to the decision of step S1109 in step S1110. For example, step S1109 may include the terminal measuring the RSRP of the FR1 NR cell within $T_{evaluate,SLSS}$ (e.g., $T_{evaluate,SLSS}$ in the example of Table 10 or Table 11). Here, when the terminal performs measurement using the measurement gap, $T_{evaluate,SLSS}$ may be $T_{evaluate,SLSS}$ in the example of Table 11. When the terminal performs measurement without a measurement gap, $T_{evaluate,SLSS}$ may be $T_{evaluate,SLSS}$ in the example of Table 10. In addition, the terminal may compare the measured RSRP with syncTx-ThreshIC and determine to transmit SLSS when the RSRP is equal to or less than syncTxThreshIC. The terminal may not transmit SLSS when RSRP is greater than syncTx-ThreshIC.

In steps S1111 and S1112, the operation of the terminal described in the case (e.g. i-1-b) For FR2 NR cell as synchronization reference source) where the FR2 NR cell of Case 3-1 is a synchronization reference source may be performed. In step S1111, the terminal may determine whether to transmit the SLSS as described in Case 3-1 (when the FR2 NR cell is a synchronization reference source). And, in step S1112, the terminal may transmit the SLSS or not transmit the SLSS according to the decision of step S1111. Specifically, when performing steps S1111 and S1112, the operation described in "i-1-b) For FR2 NR cell as synchronization reference source" may be performed. For example, when proposal 1 is applied, the terminal can always transmit SLSS. For example, when proposal 2 is applied, the terminal can always transmit SLSS if the mobile speed of the terminal is high. For example, when proposal 3 is applied, when FR2 NR Cell is set as a synchronization reference source, if the movement speed of the terminal is small (or slow), the terminal may compare/evaluate the DL RSRP measurement value and a threshold (e.g., syncTxThreshIC) to start and/or stop transmission of SLSS. For example, when proposal 4 is applied, when FR2 NR Cell is set as a synchronization reference source, the terminal may compare/evaluate the DL RSRP measurement value and a threshold (e.g., syncTx-ThreshIC) to start and/or stop transmission of SLSS. When proposal 3 or proposal 4 is applied, when the terminal may perform measurement using the measurement gap, $T_{evaluate,SLSS}$ may be $T_{evaluate,SLSS}$ in the example of Table 13. When the UE performs measurement without a measurement gap, $T_{evaluate,SLSS}$ may be $T_{evaluate,SLSS}$ in the example of Table 12.

In step S1113, the terminal may determine what the synchronization reference source is. For example, when the synchronization reference source is the SyncRef UE, the terminal may perform steps S1114 and S1115. For example, when the synchronization reference source is GNSS, the terminal may perform steps S1116 and S1117. For example, when the synchronization reference source is the E-UTRAN cell, the terminal may perform steps S1118 and S1119. For example, when the synchronization reference source is the FR1 NR cell, the terminal may perform steps S1120 and S1121. For example, when the synchronization reference source is the FR2 NR cell, the terminal may perform steps S1122 and S1123.

In steps S1114 and S1115, the operation of the terminal described in Case 4-4 may be performed. In step S1114, the terminal may determine whether to transmit the SLSS according to the description in Case 4-4. And, the terminal may transmit SLSS or not transmit SLSS according to the decision in step S1114 in step S1115. For example, step S1114 may include determining whether the UE uses beam management and measuring the PSBCH-RSRP of the Syn-cRef UE in $T_{evaluate,SLSS}$ by the UE. Here, when the UE uses the beam magazine, $T_{evaluate,SLSS}$ may be $T_{evaluate,SLSS}$ in the example of Table 16, as described in the example of Case 4-4. And, when the UE does not use the beam magazine, $T_{evaluate,SLSS}$ may be $T_{evaluate,SLSS}$ in the example of Table 15. The UE may compare the measured PSBCH-RSRP with syncTxThreshOoC and determine to transmit the SLSS when the PSBCH-RSRP is equal to or less than syncTx-ThreshOoC. The UE may not transmit SLSS when PSBCH-RSRP is greater than syncTxThreshOoC.

In steps S1116 and S1117, the operation of the terminal described in Case 4-3 may be performed. Steps S1116 and S1117 may be performed in the same manner as steps S1105 and S1106 described above.

In steps S1118 and S1119, the operation of the terminal described in Case 4-2 may be performed. Steps S1118 and S1119 may be performed in the same manner as steps S1107 and S1108 described above.

In steps S1120 and S1121, the operation of the terminal described in the case where the FR1 NR cell of Case 4-1 is a synchronization reference source may be performed. Steps S1120 and S1121 may be performed in the same manner as steps S1109 and S1110 described above.

In steps S1122 and S1123, the operation of the UE described in the case where the FR2 NR cell of Case 4-1 is a synchronization reference source may be performed. Steps S1122 and S1123 may be performed in the same manner as steps S1111 and S1112 described above.

Hereinafter, with reference to FIG. 12, an operation of a terminal in the disclosure of the present specification (e.g., the first disclosure of the present specification and/or the second disclosure of the present specification) described with reference to various examples will be described.

The following drawings are made to explain a specific example of the present specification. Since the names of specific devices or names of specific signals/messages/fields described in the drawings are provided as examples, the technical features of the present specification are not limited to the specific names used in the drawings below.

Figure 12:
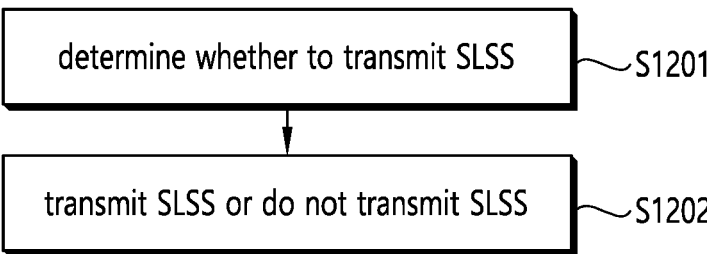
FIG. 12 shows an example of an operation of a terminal according to an embodiment of the disclosure of the present specification.

FIG. 12 shows an example of an operation of a terminal according to an embodiment of the disclosure of the present specification.

The following drawings are made to explain a specific example of the present specification. Since the names of specific devices or names of specific signals/messages/fields described in the drawings are provided as examples, the technical features of the present specification are not limited to the specific names used in the drawings below.

The operation of the terminal shown in FIG. 12 is only an example, and the scope of the disclosure of the present specification is not limited by the contents shown in FIG. 12. For example, the terminal may perform an operation not shown in FIG. 12. As an example, the terminal may perform the operation of the terminal described in various examples of the disclosure of the present specification above.

For example, the terminal may perform the operation described in various examples of the first disclosure of the present specification. For example, when the UE uses SL DRX, the UE may perform the operations described in various examples in the second disclosure of the present specification.

In step S1201, the terminal may determine whether to transmit SLSS. As described above with reference to various examples, the terminal may determine whether to transmit SLSS. For example, the terminal may determine whether or not to transmit the SLSS based on whether the terminal supports FR1 SL communication and/or FR2 SL communication, whether which is the synchronization reference source of the terminal, whether the UE performs SL DRX, whether the UE performs measurement using a measurement gap, whether or not to transmit the SLSS may be determined based on the movement speed of the UE and the like. For specific operations performed by the terminal, reference is made to the previously described disclosure of the present specification (e.g., including the first disclosure and the second disclosure of the present disclosure).

In step S1202, the terminal may transmit SLSS or not transmit SLSS according to the decision in step S1201.

According to the disclosure of the present specification with reference to various examples, an operation for the NR UE to start transmission of SLSS and an operation for stopping transmission of SLSS may be clearly defined. Accordingly, the NR UE can efficiently start or stop transmission of SLSS. According to what has been described in the disclosure of the present specification, SL communication can be efficiently performed.

For reference, the operation of the UE described in the present disclosure may be performed by the device shown in FIG. 1 to FIG. 3. For example, the UE may be the first wireless device 100 or the second wireless device 200 shown in FIG. 1. For example, the operation of the UE described in the present disclosure may be processed by one or more processors 102 or 202. The operation of the UE described in the present disclosure may be stored in one or more memories 104 or 204 in the form of instruction/program (e.g., instruction, executable code, etc.) executable by the one or more processors 102 or 202. The one or more processors 102 or 202 may control the one or more memories 104 or 204 and the one or more transceivers 105 or 206 and may perform the operation of the UE described in the present disclosure by executing the instruction/program stored in the one or more memories 104 or 204.

Furthermore, the instructions for performing the operation of the UE described in the present disclosure may be stored in a non-volatile computer readable storage medium. The storage medium may be included in the one or more memories 104 or 204. In addition, the instructions stored in the storage medium may be executed by the one or more processors 102 or 202, and the operation of the UE described in the present disclosure may be performed.

For reference, the operation of the BS (e.g., NG-RAN, gNB, gNB (NB-IoT), gNB (NR) eNB, RAN, etc.) described in the present disclosure may be implemented by the device shown in FIG. 1 to FIG. 3. For example, the BS (e.g., NG-RAN, gNB, gNB (NB-IoT), gNB (NR) eNB, RAN, etc.) may be the first wireless device 100a or the second wireless device 100b shown in FIG. 1. For example, the operation of the BS (e.g., NG-RAN, gNB, gNB (NB-IoT), gNB (NR) eNB, RAN, etc.) described in the present disclosure may be processed by one or more processors 102 or 202. The operation of the UE described in the present disclosure may be stored in one or more memories 104 or 204 in the form of instruction/program (e.g., instruction, executable code, etc.) executable by the one or more processors 102 or 202. The one or more processors 102 or 202 may control the one or more memories 104 or 204 and the one or more transceivers 105 or 206 and may perform the operation of the BS (e.g., NG-RAN, gNB, gNB (NB-IoT), gNB (NR) eNB, RAN, etc.) described in the present disclosure by executing the instruction/program stored in the one or more memories 104 or 204.

Furthermore, the instructions for performing the operation of the BS (e.g., NG-RAN, gNB, gNB (NB-IoT), gNB (NR) eNB, RAN, etc.) described in the present disclosure may be stored in a non-volatile (or non-transitory) computer readable storage medium. The storage medium may be included in the one or more memories 104 or 204. In addition, the instructions stored in the storage medium may be executed by the one or more processors 102 or 202, and the operation of the BS (e.g., NG-RAN, gNB, gNB (NB-IoT), gNB (NR) eNB, RAN, etc.) described in the present disclosure may be performed.

So far, the preferred embodiment has been described in an exemplary manner. However, the disclosure of the present specification is not limited to the specific embodiment and may be modified, altered, or improved in various forms within the inventive concept and the scope written in the claims of the present disclosure.

In the exemplary system described above, the methods are described based on a flowchart as a series of steps or blocks. However, the methods are not limited to the order of the steps described above, and a certain step may be performed in a different order or performed simultaneously. Furthermore, it is understood that the steps shown in the flowchart are not mutually exclusive, but another step may be included, or one or more steps may be deleted without influencing the scope to those ordinary skilled in the art.

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A User Equipment (UE) comprising:
at least one transceiver;
at least one processor; and
at least one computer memory operably connected to the at least one processor and storing instructions that, based on being executed by the at least one processor, perform operations comprising:
based on that a SyncRef UE is used as a synchronization reference source, performing a measurement related to the SyncRef UE within an evaluation period; and
initiating or ceasing a Sidelink (SL) Synchronization Signal (SLSS) transmission, based on the measurement related to the SyncRef UE,
wherein the evaluation period is 4 times a Sidelink-Synchronization Signal Block (S-SSB) period, based on a SL Discontinuous Reception (DRX) cycle being equal to or less than 160 milliseconds (ms), and
wherein the evaluation period is 4 times the SL DRX cycle, based on the SL DRX cycle being greater than 160 ms.

2. The UE of claim 1, wherein the SLSS transmission is initiated, based on a measurement value based on the measurement being smaller than a threshold, and wherein the SLSS transmission is ceased, based on the measurement value being equal to or bigger than the measurement threshold.

3. A method comprising:

based on that a SyncRef User Equipment (UE) is used as a synchronization reference source, performing, by a UE, a measurement for the SyncRef UE within an evaluation period; and initiating or ceasing, by the UE, a Sidelink (SL) Synchronization Signal (SLSS) transmission, based on the measurement related to the SyncRef UE, wherein the evaluation period is 4 times a Sidelink-Synchronization Signal Block (S-SSB) period, based on a SL Discontinuous Reception (DRX) cycle being equal to or less than 160 milliseconds (ms), and wherein the evaluation period is 4 times the SL DRX cycle, based on the SL DRX cycle being greater than 160 ms.

4. The method of claim 3, wherein the SLSS transmission is initiated, based on a measurement value based on the measurement being smaller than a threshold, and wherein the SLSS transmission is ceased, based on the measurement value being equal to or bigger than the measurement threshold.

\* \* \* \* \*